(12) United States Patent
Kamii

(10) Patent No.: US 11,659,129 B2
(45) Date of Patent: *May 23, 2023

(54) INFORMATION PROCESSING APPARATUS AND DISPLAY METHOD

(71) Applicant: TOSHIBA TEC KABUSHIKI KAISHA, Tokyo (JP)

(72) Inventor: Shin Kamii, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,460

(22) Filed: Jun. 21, 2022

(65) Prior Publication Data
US 2022/0321733 A1 Oct. 6, 2022

Related U.S. Application Data

(63) Continuation of application No. 17/193,002, filed on Mar. 5, 2021, now Pat. No. 11,394,851.

(51) Int. Cl.
H04N 1/393 (2006.01)
H04N 1/00 (2006.01)

(52) U.S. Cl.
CPC ......... *H04N 1/393* (2013.01); *H04N 1/00442* (2013.01); *H04N 1/00567* (2013.01); *H04N 1/00809* (2013.01); *H04N 2201/0094* (2013.01); *H04N 2201/043* (2013.01)

(58) Field of Classification Search
CPC ........... H04N 1/393; H04N 2201/0094; H04N 1/00442; H04N 1/00567; H04N 2201/043; H04N 1/00809
See application file for complete search history.

(56) References Cited

U.S. PATENT DOCUMENTS

| 5,933,585 A * | 8/1999 | Wagensonner | H04N 1/3875 358/1.18 |
| 5,982,350 A * | 11/1999 | Hekmatpour | H04N 5/262 345/473 |
| 6,891,642 B1 * | 5/2005 | Shigehiro | H04N 1/3872 358/450 |
| 8,917,951 B1 * | 12/2014 | Chen | G06V 10/751 382/218 |

(Continued)

FOREIGN PATENT DOCUMENTS

JP 10-157211 A 6/1998

OTHER PUBLICATIONS

Non-Final Office Action on U.S. Appl. No. 17/193,002 dated Nov. 22, 2021.

(Continued)

*Primary Examiner* — Ted W Barnes
(74) *Attorney, Agent, or Firm* — Foley & Lardner LLP

(57) ABSTRACT

An information processing apparatus includes a controller and a display. The controller is configured to (a) acquire first image data, (b) acquire multiple sets of image data, each set of image data corresponding to a reading of an object by a scanner, and (c) generate second image data corresponding to the object based on the sets image data. The display is configured to display both (a) a first image based on the first image data and (b) a second image based on the second image data, the first image being superimposed on the second image.

20 Claims, 12 Drawing Sheets

(56) References Cited

U.S. PATENT DOCUMENTS

| | | | | |
|---|---|---|---|---|
| 10,015,340 | B2* | 7/2018 | Fukumoto | H04N 1/0044 |
| 10,043,268 | B2* | 8/2018 | Yoshida | G06T 7/0012 |
| 10,157,211 | B2* | 12/2018 | Benke | G06F 16/254 |
| 10,628,698 | B1* | 4/2020 | Pellikka | G06T 3/4038 |
| 10,643,097 | B2* | 5/2020 | Kobayashi | H04N 1/3875 |
| 2004/0189674 | A1* | 9/2004 | Zhang | H04N 1/04 |
| | | | | 345/629 |
| 2004/0234115 | A1* | 11/2004 | Zijp | G06T 5/003 |
| | | | | 382/131 |
| 2006/0171010 | A1* | 8/2006 | Yang | B41J 2/471 |
| | | | | 359/201.1 |
| 2006/0209366 | A1* | 9/2006 | Edwards | H04N 1/3876 |
| | | | | 358/449 |
| 2007/0106561 | A1* | 5/2007 | Lubow | B42D 25/25 |
| | | | | 382/118 |
| 2008/0232712 | A1* | 9/2008 | Matsui | G06T 11/60 |
| | | | | 382/277 |
| 2008/0294973 | A1* | 11/2008 | Suleiman | H04N 1/60 |
| | | | | 715/202 |
| 2008/0297859 | A1* | 12/2008 | Iwatsuka | H04N 1/387 |
| | | | | 358/500 |
| 2010/0296129 | A1* | 11/2010 | Zahnert | G06T 7/33 |
| | | | | 358/449 |
| 2010/0296131 | A1* | 11/2010 | Zahnert | G06T 7/30 |
| | | | | 358/450 |
| 2010/0296133 | A1* | 11/2010 | Zahnert | H04N 1/00127 |
| | | | | 358/473 |
| 2010/0296137 | A1* | 11/2010 | Zahnert | H04N 1/1071 |
| | | | | 358/488 |
| 2010/0296140 | A1* | 11/2010 | Zahnert | G06T 3/4038 |
| | | | | 382/284 |
| 2011/0102861 | A1* | 5/2011 | Nuttall | H04N 1/1017 |
| | | | | 29/592.1 |
| 2012/0048920 | A1* | 3/2012 | Iizaka | G06K 19/14 |
| | | | | 235/375 |
| 2012/0307101 | A1* | 12/2012 | Fukuya | H04N 23/635 |
| | | | | 348/222.1 |
| 2013/0128026 | A1* | 5/2013 | Hirose | G01N 21/8903 |
| | | | | 348/125 |
| 2013/0141524 | A1* | 6/2013 | Karunamuni | G06T 3/4038 |
| | | | | 348/38 |
| 2015/0055154 | A1* | 2/2015 | Hasegawa | G06T 11/60 |
| | | | | 358/1.9 |
| 2015/0208001 | A1* | 7/2015 | Kaneko | H04N 23/672 |
| | | | | 348/239 |
| 2015/0350489 | A1* | 12/2015 | Hasegawa | H04N 1/3876 |
| | | | | 358/449 |
| 2016/0048965 | A1* | 2/2016 | Stehle | A61B 5/4064 |
| | | | | 382/131 |
| 2016/0094755 | A1* | 3/2016 | Shi, I | H04N 1/3876 |
| | | | | 358/1.18 |
| 2016/0227181 | A1* | 8/2016 | Ilic | H04N 23/63 |
| 2016/0309085 | A1* | 10/2016 | Ilic | G06T 3/4038 |
| 2016/0328827 | A1* | 11/2016 | Ilic | H04N 5/2624 |
| 2017/0011488 | A1* | 1/2017 | Cohen | H04N 23/57 |
| 2017/0061703 | A1* | 3/2017 | Ryu | G06T 7/194 |
| 2017/0256054 | A1* | 9/2017 | Matsumura | A61B 3/0025 |
| 2018/0330472 | A1* | 11/2018 | Elhage | G06T 5/003 |
| 2019/0014229 | A1* | 1/2019 | Tanaka | H04N 1/00442 |
| 2019/0114740 | A1* | 4/2019 | Ogino | H04N 23/60 |
| 2019/0114795 | A1* | 4/2019 | Rajvanshi | G06T 7/97 |
| 2019/0364170 | A1* | 11/2019 | Galanida | H04N 1/00795 |
| 2020/0288037 | A1* | 9/2020 | Higuchi | H04N 1/00082 |
| 2021/0203808 | A1* | 7/2021 | Monden | H04N 1/0044 |

OTHER PUBLICATIONS

Notice of Allowance on U.S. Appl. No. 17/193,002 dated Mar. 17, 2022.

* cited by examiner

INFORMATION PROCESSING APPARATUS AND DISPLAY METHOD

CROSS-REFERENCE TO RELATED APPLICATION

This application is a continuation of U.S. application Ser. No. 17/193,002 filed Mar. 5, 2021, the entire contents of which are incorporated herein by reference.

FIELD

Embodiments described herein relate generally to an information processing apparatus and a display method.

BACKGROUND

Attaching a printed matter having an image printed on another paper or the like to an object that cannot be directly printed on, such as a spine of a file, is generally performed. However, proper setting of a size of an image on a screen according to a size of the object is difficult. Outputting the printed image a plurality of times using a printing apparatus for fine adjustment of the size of the image of the printed matter wastes paper and toner.

DETAILED DESCRIPTION

In general, according to one embodiment, there is provided an information processing apparatus including a controller and a display. The controller is configured to (a) acquire first image data, (b) acquire multiple sets of image data, each set of image data corresponding to a reading of an object by a scanner, and (c) generate second image data corresponding to the object based on the sets of image data. The display is configured to display both (a) a first image based on the first image data and (b) a second image based on the second image data, the first image being superimposed on the second image.

Figure 1:
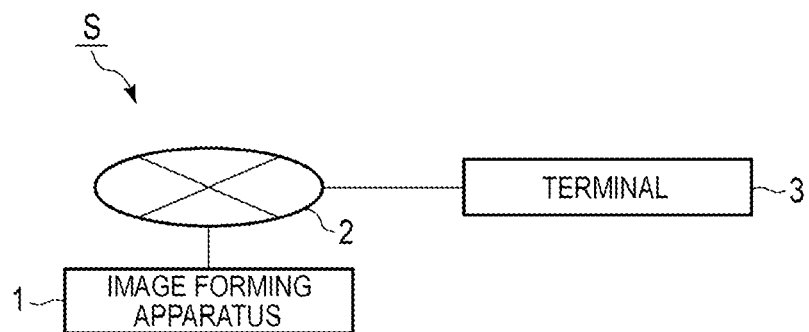
FIG. 1 is a block diagram illustrating an information processing system according to an embodiment.

Hereinafter, embodiments will be described with reference to the accompanying drawings. FIG. 1 is a block diagram illustrating an information processing system S. The information processing system S includes an image forming apparatus 1 and a terminal 3. The image forming apparatus 1 and the terminal 3 are connected freely communicably to each other via a network 2 in a wired or wireless manner. For example, the network 2 is a local area network (LAN) or the like.

The image forming apparatus 1 is an apparatus having an electrophotographic printing function. In this embodiment, the image forming apparatus 1 will be described as being a digital multifunction peripheral (MFP) having a copy function, a print function, a facsimile function, a scanner function, and the like. The image forming apparatus 1 is an example of an information processing apparatus. A configuration example of the image forming apparatus 1 will be described later.

The terminal 3 is a device capable of information processing. For example, the terminal 3 is a personal computer (PC), a tablet terminal, a smartphone, or the like, but is not limited thereto.

Figure 2:
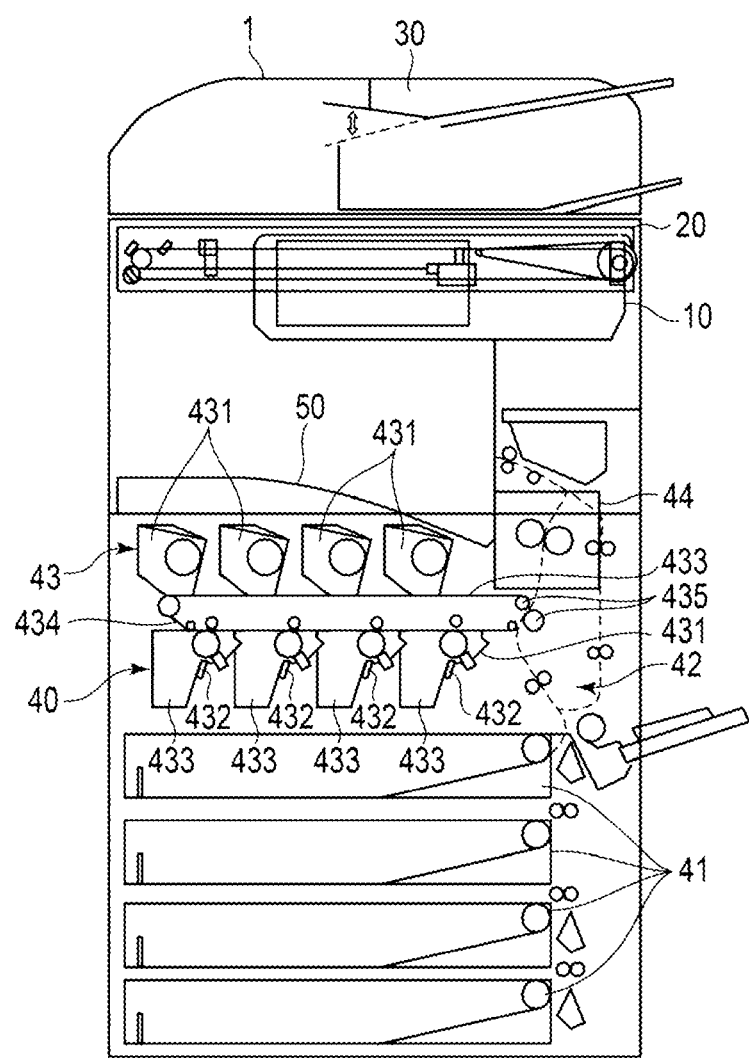
FIG. 2 is a diagram illustrating an outline of a configuration example of an image forming apparatus according to an embodiment.

FIG. 2 is a diagram illustrating an outline of a configuration example of the image forming apparatus 1. The image forming apparatus 1 includes a control panel 10, a scanner unit 20, an automatic document feeder 30, a printer unit 40, and a paper discharge tray 50.

The control panel 10 includes a display device that displays various screens. The control panel 10 includes an input device for inputting an instruction based on an operation of an operator. The operator may be read as a user or a person.

The scanner unit 20 is a device that reads an image (e.g., a source image) from a medium such as a document. For example, the medium is paper, but is not limited thereto. The scanner unit 20 includes a line sensor. As the line sensor, a charge coupled device (CCD) line sensor may be adopted. As the line sensor, a contact image sensor (CIS) may be adopted. The line sensor may adopt a sensor other than these. The scanner unit 20 generates image data based on an image read by using the line sensor. The scanner unit 20 is an example of a scanner.

The automatic document feeder 30 is a device that conveys a medium such as a document to a reading position of the scanner unit 20. The automatic document feeder 30 includes a tray on which a medium is placed. The automatic document feeder 30 conveys the medium placed on the tray to the reading position of the scanner unit 20 one after another.

The printer unit 40 is a device that forms an image on the medium by fixing a toner image transferred to the medium. The printer unit 40 may form the image on the medium based on the image data generated by the scanner unit 20. The printer unit 40 may form the image on the medium based on image data received by the image forming apparatus 1 from another apparatus. The printer unit 40 is an example of a printer.

The paper discharge tray 50 is a tray on which a medium, which is discharged from the printer unit 40 and on which an image is formed by the printer unit 40, is placed.

The printer unit 40 includes an accommodation unit 41, a conveyance unit 42, an image forming unit 43, and a fixing unit 44.

The accommodation unit 41 (e.g., a paper feeder, a paper storage assembly, a paper storage tray, etc.) is an element that accommodates the medium. The accommodation unit 41 includes a plurality of paper feed cassettes. Each paper feed cassette accommodates a medium of a predetermined size and type. Each paper feed cassette includes a pickup roller. The pickup roller picks up the media one by one from the paper feed cassette. The pickup roller supplies the picked-up medium to the conveyance unit 42.

The conveyance unit 42 includes a plurality of rollers, a plurality of convey guides, and the like for conveying the medium in the image forming apparatus 1. The conveyance unit 42 conveys the medium supplied from the accommodation unit 41 in the order of the image forming unit 43 and the fixing unit 44. The conveyance unit 42 conveys the medium, on which the image is formed and which is passed through the fixing unit 44, to the paper discharge tray 50.

The image forming unit 43 is an element that forms a toner image on the medium. The image forming unit 43 includes a plurality of toner cartridges 431, a plurality of developing units 432, a plurality of exposure devices 433, an intermediate transfer belt 434, and a transfer unit 435.

Each of the plurality of toner cartridges 431 is an element that stores the toner. The plurality of toner cartridges 431 are a plurality of toner cartridges that each store toner of a color. The plurality of toner cartridges 431 include a cyan toner cartridge, a magenta toner cartridge, a yellow toner cartridge, and a black toner cartridge. The plurality of toner cartridges 431 may include toner cartridges of decolorable toner that is decolored at a temperature higher than a predetermined temperature. Each toner cartridge 431 supplies the toner to each developing unit 432. When the image forming apparatus 1 is an apparatus for forming an image on a medium in a single color, the image forming unit 43 is configured to include one toner cartridge 431 instead of a plurality of the toner cartridges.

Each of the plurality of developing units 432 (e.g., developers) is an element that performs multiple transfer of the toner image of a color on a surface of the intermediate transfer belt 434. The plurality of developing units 432 are a plurality of developing units corresponding to toner of a color. The plurality of developing units 432 include a cyan developing unit, a magenta developing unit, a yellow developing unit, and a black developing unit. The plurality of developing units 432 may include developing units for decolorable toner. When the image forming apparatus 1 is an apparatus for forming an image on a medium in a single color, the image forming unit 43 is configured to include one developing unit 432 instead of a plurality of developing units.

Each developing unit 432 includes a photoconductor drum. Each developing unit 432 includes a charger, a developing device, a primary transfer roller, a cleaning unit, a destaticizer, and the like around the photoconductor drum.

The photoconductor drum is an image carrier having a photoconductor layer on a surface thereof. The photoconductor drum rotates about the axis.

The charger uniformly charges the photoconductor layer on the surface of the photoconductor drum. For example, the charger charges the surface of the photoconductor drum to be in the negative polarity.

The developing device develops an electrostatic latent image on the surface of the photoconductor drum using the toner supplied from the toner cartridge 431. That is, the developing device makes the toner adhere to the electrostatic latent image of the photoconductor drum and forms the toner image on the surface of the photoconductor drum.

The primary transfer roller is located at a position facing the photoconductor drum with the intermediate transfer belt 434 interposed therebetween. The primary transfer roller transfers the toner image on the surface of the photoconductor drum to the surface of the intermediate transfer belt 434. The transfer of the toner image from the photoconductor drum to the intermediate transfer belt 434 by the primary transfer roller is also referred to as primary transfer.

The cleaning unit is located at a subsequent stage of the position where the toner image on the surface of the photoconductor drum has been transferred to the surface of the intermediate transfer belt 434. The cleaning unit scrapes off untransferred toner that was not transferred to the intermediate transfer belt 434 from the surface of the photoconductor drum.

The destaticizer is located at a position facing the photoconductor drum that passes through the cleaning unit. The destaticizer irradiates the surface of the photoconductor drum with light to destaticize the photoconductor layer of the photoconductor drum. The charges on the photoconductor layer of the photoconductor drum are made uniform.

Each of the plurality of exposure devices 433 is an element that forms an electrostatic latent image on the surface of the photoconductor drum of each developing unit 432. Each exposure device 433 is located at a position facing each developing unit 432. Each exposure device 433 includes a semiconductor laser light source. Each exposure device 433 irradiates the surface of the photoconductor drum of each developing unit 432 with laser light via an optical system such as a polygon mirror. Each exposure device 433 forms an electrostatic pattern as an electrostatic latent image at a position on the surface of the photoconductor drum irradiated with laser light. Each exposure device 433 may include a light emitting diode (LED) instead of the laser light source. When the image forming apparatus 1 is an apparatus for forming an image on a medium in a single color, the image forming unit 43 is configured to include one exposure device 433 instead of a plurality of exposure devices.

The intermediate transfer belt 434 is an endless belt. The intermediate transfer belt 434 can be rotated by action of a roller. The intermediate transfer belt 434 passes between the photoconductor drum of each developing unit 432 and the primary transfer roller.

The transfer unit 435 is an element that transfers a charged toner image on the surface of the intermediate transfer belt 434 to a medium. The transfer of the toner image from the intermediate transfer belt 434 to the medium by the transfer unit 435 is also referred to as secondary transfer. The transfer unit 435 includes a support roller and a secondary transfer roller that face each other. The support roller and the secondary transfer roller are configured to pinch the intermediate transfer belt 434 and the medium from both sides in the thickness direction. The support roller is also a roller that drives the intermediate transfer belt 434 (e.g., through frictional engagement).

The fixing unit 44 is a fixing device that heats and pressurizes the medium on which the toner image is transferred to fix the toner image on the medium. The fixing unit 44 includes a heat roller and a pressurizing roller facing each other. The heat roller is a roller provided with a heat source. For example, the heat source is a heater. The heat roller heats the medium on which the toner image is transferred. The pressurizing roller pressurizes the medium on which the toner image passing between the pressurizing roller and the heat roller is transferred.

Figure 3:
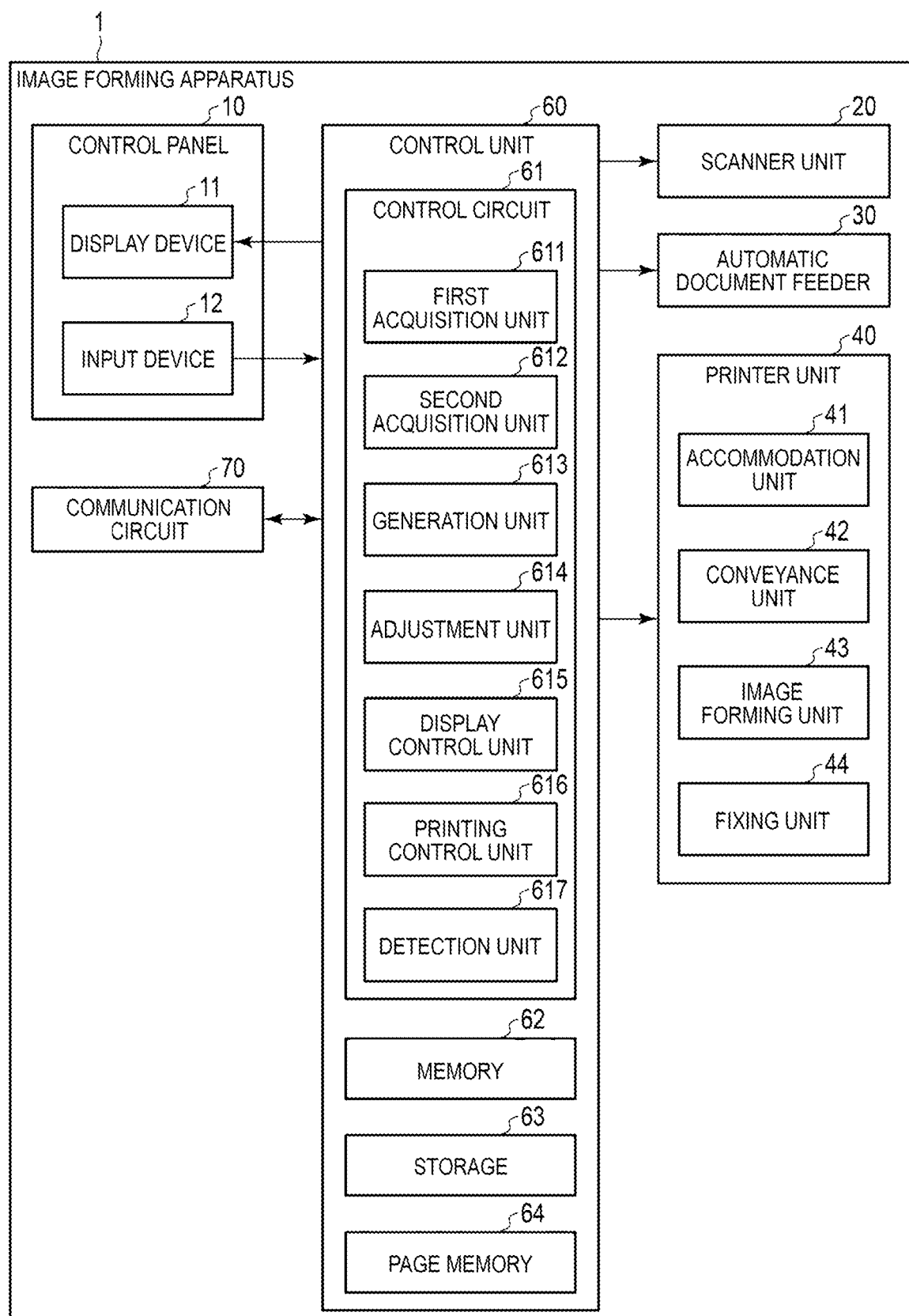
FIG. 3 is a block diagram illustrating the outline of the configuration example of the image forming apparatus of FIG. 2.

FIG. 3 is a block diagram illustrating an outline of a configuration example of the image forming apparatus 1. The image forming apparatus 1 includes a control unit 60 (e.g., a controller) and a communication circuit 70 in addition to the control panel 10, the scanner unit 20, the automatic document feeder 30, and the printer unit 40 described above.

The control panel 10 (e.g., a user interface, an operator interface, etc.) includes a display device 11 (e.g., a display) and an input device 12. The display device 11 is a liquid crystal display, an organic electroluminescence (EL) display, or the like, that is configured to provide information to a user. The display device 11 is an example of a display unit. The input device 12 is a touch panel, a hardware key, or the like. The touch panel is configured by stacking the display device 11 and the input device 12. The input device 12 acquires an instruction of the operator. The input device 12 is an example of an input unit.

The control unit 60 configures a computer that controls the operation of each part of the image forming apparatus 1. The control unit 60 includes a control circuit 61, a memory 62, a storage 63, and a page memory 64.

The control circuit 61 corresponds to a central part of a computer. For example, the control circuit 61 is a circuit including a processor such as a central processing unit (CPU). The control circuit 61 may include an application specific integrated circuit (ASIC), a field programmable gate array (FPGA), a graphics processing unit (GPU), or the like in addition to or in place of the CPU. The control circuit 61 loads the program stored in the storage 63 or the like into the memory 62. The control circuit 61 executes various operations by executing the program loaded into the memory 62. The program is a program that realizes each part described later in the control circuit 61.

The memory 62 includes a read only memory (ROM) and a random access memory (RAM). The ROM corresponds to a main memory of a computer including the control circuit 61 as a central part. The ROM is a non-volatile memory. The ROM stores data or various set values used for performing various processes by the control circuit 61. The RAM corresponds to the main memory of the computer including the control circuit 61 as a central part. The RAM is a memory used for reading and writing data. The RAM is a so-called work area where data temporarily used for performing various processes by the control circuit 61 is stored.

The storage 63 corresponds to an auxiliary storage device of the computer including the control circuit 61 as a central part. For example, the storage 63 is an electric erasable programmable read-only memory (EEPROM) (registered trademark), a hard disk drive (HDD), a solid state drive (SSD), or the like. The storage 63 stores the program described above. The storage 63 stores data used for performing various processes by the control circuit 61. The storage 63 can store image data generated by the scanner unit 20 based on reading by the scanner unit 20. The storage 63 can store image data received from the terminal 3 by the image forming apparatus 1. The storage 63 is an example of a storage unit.

The page memory 64 is a memory having a storage area for loading image data for at least one page. The image data is transferred from the page memory 64 to the storage 63.

The communication circuit 70 (e.g., a network interface) is an interface that enables the image forming apparatus 1 to communicate with another apparatus via the network 2. The communication circuit 70 is an example of a communication interface. The communication circuit 70 is an example of a communication unit.

Next, each part installed on the control circuit 61 will be described. On the control circuit 61, a first acquisition unit 611, a second acquisition unit 612, a generation unit 613, an adjustment unit 614, a display control unit 615, a printing control unit 616, and a detection unit 617 are installed. Each part installed on the control circuit 61 can also be called each function. It can also be said that each part installed on the control circuit 61 is installed on the control unit 60 including the control circuit 61 and the memory 62.

The first acquisition unit 611 acquires first image data. The first image data is image data targeted for printing. The printing target is a target to be formed as an image on a medium by the printer unit 40. The first image data may be image data generated by the scanner unit 20 based on reading of the medium by the scanner unit 20. In this example, a first image based on the first image data is an image having a size of the medium read by the scanner unit 20. The first image data may be image data received by the image forming apparatus 1 from the terminal 3. In this example, the first image based on the first image data is an image having a size designated by the terminal 3. The first image is an image of the printing target. The first image is a rectangular image including an image portion in which a picture or a character is present and a blank portion in which the picture or a character is not present.

The second acquisition unit 612 acquires a plurality of image data (e.g., multiple sets of partial image data) based on a plurality of times of readings of the object by the scanner unit 20 (e.g., capturing a first image of a first portion of the object, then subsequently capturing a second image of a second portion of the object, etc.). The object is an object targeted for use of a printed matter based on the first image data. The printed matter is a medium on which an image is formed by the printer unit 40. For example, the object is an object having a size that does not fit in a reading area of the scanner unit 20, but is not limited thereto. The reading area of the scanner unit 20 is a reading area of the scanner unit 20 on the document platen. For example, the reading area of the scanner unit 20 is the size of A3, but the reading area may be different in size from A3 depending on the device. A plurality of image data based on a plurality of times of readings of an object are also referred to as a plurality of image data relating to the object. Each of the plurality of pieces of image data relating to the object is image data based on reading a part of the object (e.g., a portion of the object, a section of the object, etc.), not the entire object. The plurality of image data relating to the object are data of images different from each other.

The generation unit 613 generates second image data relating to the object based on the plurality of image data relating to the object acquired by the second acquisition unit 612. The second image data is data of the entire image of the object. A second image based on the second image data is an image including the entire object (i.e., the second image data corresponds to or provides a complete image of the object). The second image is a rectangular image including an image portion corresponding to the entire object and a blank portion.

The adjustment unit 614 adjusts the size of the first image based on the first image and the second image.

The display control unit 615 causes the display device 11 to display the first image to be superimposed on the second image. For example, the display control unit 615 causes the display device 11 to display the first image whose size is adjusted by the adjustment unit 614 to be superimposed on the second image. Superimposing includes overlaying (e.g., the first image is displayed on top of the second image, etc.). The display control unit 615 may transparently display at least one of the first image and the second image.

The printing control unit 616 controls printing based on a printing instruction input by the operator on the input device 12.

The detection unit 617 detects various instructions input by the operator on the input device 12.

Figure 4:
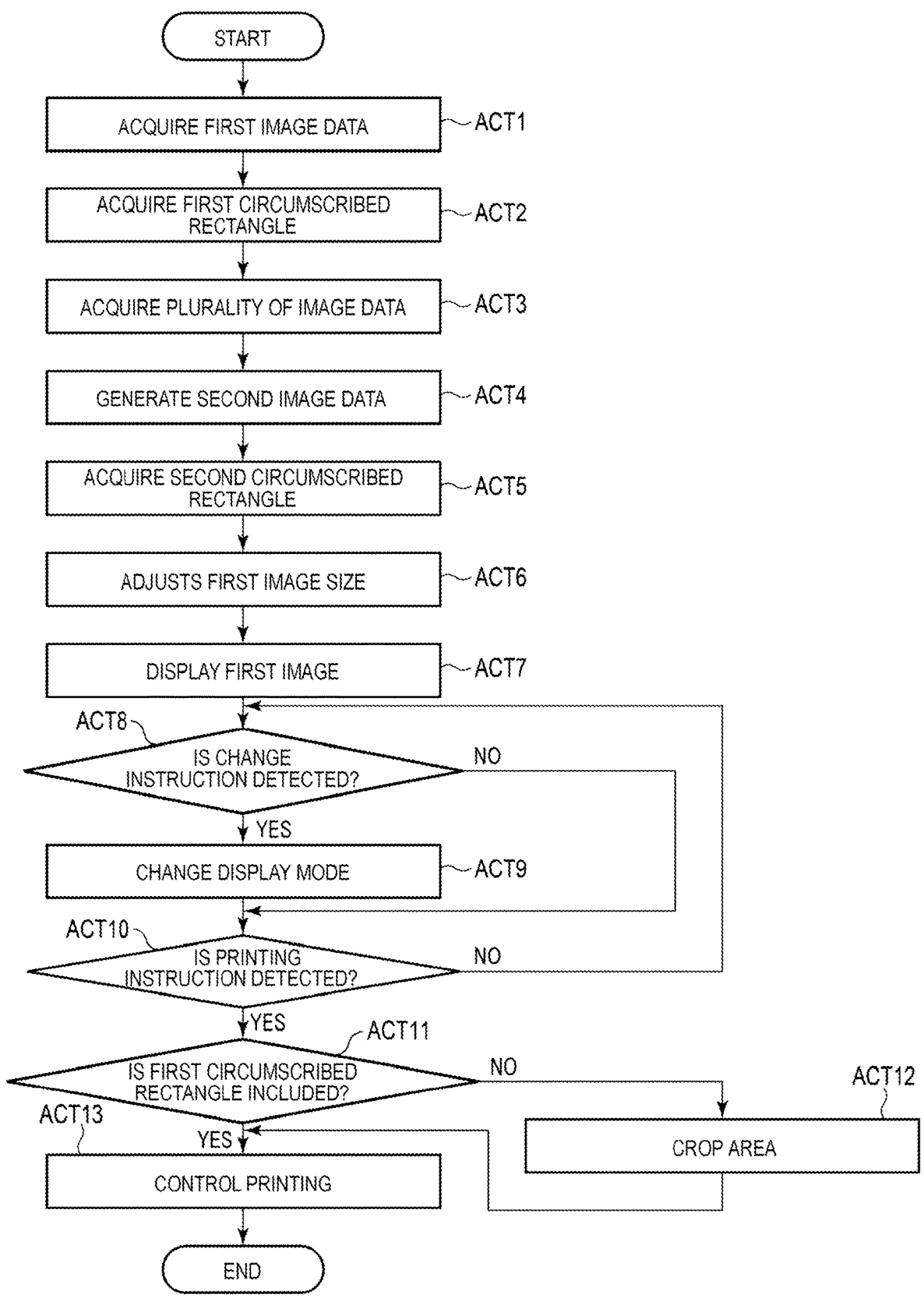
FIG. 4 is a flowchart illustrating a processing procedure for displaying an image in the image forming apparatus of FIG. 2.

Next, a processing procedure for displaying an image in the image forming apparatus 1 will be described. FIG. 4 is a flowchart illustrating the processing procedure for displaying the image in the image forming apparatus 1. The processing procedure described below is only an example, and each process may be changed as much as possible. The processing procedure described below can be omitted, replaced, or added as appropriate depending on the embodiment.

The first acquisition unit 611 acquires the first image data (ACT 1). In ACT 1, for example, the first acquisition unit 611 acquires the first image data based on an image display start instruction input by the operator via the input device 12. The first acquisition unit 611 acquires the first image data from the storage 63. The storage 63 may store the first image data.

The adjustment unit 614 acquires or identifies a first circumscribed rectangle of the first image based on the first image data acquired by the first acquisition unit 611 (ACT 2). In ACT 2, for example, the adjustment unit 614 regards a blank portion around the image portion or a portion outside the document from the content of the first image as an area not targeted for printing, and acquires a printing target area as the first circumscribed rectangle. In this example, the adjustment unit 614 detects a subject such as a picture or a character included in the first image by edge extraction, and acquires a rectangle circumscribing all of the detected one or more objects as the first circumscribed rectangle. The first circumscribed rectangle is the smallest rectangle, which includes the entire image portion, of the first image. A picture, a character, or the like is present inside the first circumscribed rectangle, and the picture, the character, or the like is not present outside the first circumscribed rectangle (e.g., the entire area outside the first circumscribed rectangle is blank).

A vertical direction of the first circumscribed rectangle is parallel to a vertical direction of the first image. A horizontal direction of the first circumscribed rectangle is parallel to a horizontal direction of the first image. An outer edge of the first circumscribed rectangle may or may not be the same as an outer edge of the first image. A rectangular area defined by the first circumscribed rectangle is also referred to as the first circumscribed rectangular area. The notation of the first circumscribed rectangle may be read as the first circumscribed rectangle area. The identification of the vertical side of the first image may be set based on a selection instruction by the operator via the input device 12.

The adjustment unit 614 acquires a length a, which is a dimension of the first circumscribed rectangle measured in the vertical direction (e.g., a first vertical width). The adjustment unit 614 further acquires a length b, which is a dimension of the first circumscribed rectangle measured in the horizontal direction (e.g., a first horizontal width). The length a may be shorter than or equal to the vertical dimension of the first image (e.g., the length of the vertical width in the vertical direction of the first image). The length b may be shorter than or equal to the horizontal dimension of the first image (e.g., the length of the horizontal width in the horizontal direction of the first image).

The second acquisition unit 612 acquires a plurality of image data relating to the object (ACT 3). In ACT 3, for example, the second acquisition unit 612 acquires a plurality of image data relating to the object from the storage 63. The storage 63 can store the plurality of image data relating to the object. For example, a plurality of image data relating to an object is partial image data based on a plurality of times of readings of the object having a size that does not fit in the scanning range of the scanner, but is not limited thereto (e.g., the image data may include multiple sets of partial image data, each set of partial image data corresponding to a portion or section of an object that is too large to fit in the scanning range of the scanner).

The generation unit 613 generates the second image data based on the plurality of image data relating to the object acquired by the second acquisition unit 612 (ACT 4). In ACT 4, for example, the generation unit 613 generates the second image data based on a relationship between the plurality of images relating to the object based on the plurality of image data relating to the object.

The adjustment unit 614 acquires a second circumscribed rectangle of the second image based on the second image data generated by the generation unit 613 (ACT 5). In ACT 5, for example, the adjustment unit 614 regards a blank portion around the image portion, a portion outside the document, or the like from the content of the second image as an area not targeted for printing, and acquires the printing target area as the second circumscribed rectangle. In this example, the adjustment unit 614 detects an object corresponding to the object included in the second image by edge extraction, and acquires a rectangle circumscribing all of the detected one or more objects as the second circumscribed rectangle. The second circumscribed rectangle is the smallest rectangle including the entire image portion of the second image. The object is present inside the second circumscribed rectangle, and the object is not present outside the second circumscribed rectangle.

A vertical direction of the second circumscribed rectangle is parallel to a vertical direction of the second image. A horizontal direction of the second circumscribed rectangle is parallel to a horizontal direction of the second image. An outer edge of the second circumscribed rectangle may or may not be the same as an outer edge of the second image. The rectangular area defined by the second circumscribed rectangle is also referred to as the second circumscribed rectangular area. The notation of the second circumscribed rectangle may be read as the second circumscribed rectangle area. The identification of the vertical side of the second image may be set based on a selection instruction by the operator via the input device 12.

The adjustment unit 614 acquires a length c, which is a dimension of the second circumscribed rectangle measured in the vertical direction (e.g., a second vertical width). The adjustment unit 614 further acquires a length d, which is a dimension of the second circumscribed rectangle measured in the horizontal direction (a second horizontal width). The length c may be shorter than or equal to the vertical dimension of the second image (e.g., the length of the vertical width in the vertical direction of the second image). The length d may be shorter than or equal to the horizontal dimension of the second image (e.g., the length of the horizontal width in the horizontal direction of the second image).

The adjustment unit 614 adjusts the size of the first image (ACT 6). In ACT 6, for example, the adjustment unit 614 adjusts the size of the first image based on the first image and the second image. Adjusting the size includes enlarging, reducing, and maintaining equal magnification.

As an example of adjusting the size of the first image based on the first image and the second image, the adjustment unit 614 adjusts the size of the first image based on the first circumscribed rectangle and the second circumscribed rectangle. It is assumed that a' is the length of the first vertical width after being subjected to adjustment of the size of the first image by the adjustment unit 614. The length a' of the first vertical width after the adjustment may be different from or the same as the length a of the first vertical width before the adjustment. It is assumed that b' is the length of the first horizontal width after being subjected to adjustment of the size of the first image by the adjustment unit 614. The length b' of the first horizontal width after the adjustment may be different from or the same as the length b of the first horizontal width before the adjustment.

In this example, the adjustment unit 614 adjusts the size of the first image so as to satisfy the condition. The fact that the condition is satisfied is that the first circumscribed rectangle is included in the second circumscribed rectangle, and one or both of the length of the first vertical width and the length of the first horizontal width match the length of the second vertical width or the length of the second horizontal width. The fact that both match is that the length of the first vertical width matches the length of the second vertical width, and the length of the first horizontal width matches the length of the second horizontal width. The fact that either one matches includes the fact that the length of the first vertical width matches the length of the second vertical width, and the length of the first horizontal width is shorter than the length of the second horizontal width. The fact that either one matches includes the fact that the length of the first horizontal width matches the length of the second horizontal width, and the length of the first vertical width is shorter than the length of the second vertical width.

The adjustment unit 614 adjusts the size of the first image by setting either a first ratio or a second ratio as both the vertical and horizontal magnifications so as to satisfy the condition. The first ratio is a ratio based on the length a of the first vertical width and the length c of the second vertical width. For example, the first ratio is a value obtained by c/a, but is not limited thereto. The second ratio is a ratio based on the length b of the first horizontal width and the length d of the second horizontal width. For example, the second ratio is a value obtained by d/b, but is not limited thereto. An example of magnification setting will be described later.

The adjustment unit 614 adjusts the size of the first image by multiplying the set magnification by both the length of the width in the vertical direction and the length of the width in the horizontal direction of the first image. The length a' of the first vertical width of the first circumscribed rectangle becomes a value obtained by multiplying the set magnification and the length a with the adjustment of the size of the first image by the adjustment unit 614. The length b' of the first horizontal width of the first circumscribed rectangle becomes a value obtained by multiplying the set magnification and the length b with the adjustment of the size of the first image by the adjustment unit 614.

According to this example, the adjustment unit 614 can adjust the size of the first image based on the first image and the second image. As a result, the adjustment unit 614 can match the size of the image portion included in the first image with the size of the object included in the second image. Furthermore, the adjustment unit 614 can match the size of the image portion included in the first image with the size of an object having a size that does not fit in the reading area of the scanner unit 20. For that reason, the operator does not need to measure the size of the object when printing the first image. The operator does not need to repeatedly print the first image for fine adjustment of the size of the first image. The amount of medium and toner used can be reduced.

The display control unit 615 causes the display device 11 to display the first image whose size is adjusted by the adjustment unit 614 to be superimposed on the second image (ACT 7). In ACT 7, for example, the display device 11 displays the first image whose size is adjusted by the adjustment unit 614 to be superimposed on the second image.

According to this example, the display control unit 615 can cause the display device 11 to display the first image whose size is adjusted to be superimposed on the second image. With this configuration, the display control unit 615 can present the size of the image portion included in the first image that is matched with the size of the object included in the second image.

The detection unit 617 detects a display mode change instruction for the first image input by the operator (ACT 8). In the ACT 8, for example, the detection unit 617 detects a change instruction input by the operator via the input device 12. The display modes are various modes of displaying the first image. For example, the display mode is enlargement, reduction, rotation, or the like, but is not limited thereto. The change instruction may be an instruction such that a part of the first circumscribed rectangle does not fit in the second circumscribed rectangle. The change instruction may be an instruction based on a touch operation by the operator on the first image on the touch panel. The change instruction may be an instruction based on the input of a numerical value relating to the change of the display mode by the operator using the touch panel or the hardware key.

When it is determined that the detection unit 617 detects the change instruction (YES in ACT 8), the process transitions from ACT 8 to ACT 9. When it is determined that the detection unit 617 does not detect the change instruction (NO in ACT 8), the process transitions from ACT 8 to ACT 10.

The display control unit 615 changes the display mode of the first image based on the change instruction (ACT 9). In ACT 9, for example, the display control unit 615 changes the display mode of the first image based on the change instruction in response to the detection of the change instruction by the detection unit 617. The display control unit 615 may change the display mode by using a warpAffine transformation, for example (a linear affine warping). The display device 11 changes the display mode of the first image based on the change instruction under the control of the display control unit 615. The display control unit 615 causes the display device 11 to display the first image after being subjected to the change of the display mode to be superimposed on the second image. The display device 11 displays the first image after being subjected to the change of the display mode to be superimposed on the second image under the control of the display control unit 615.

A case where the change instruction is a reduction instruction based on a pinch-in operation by the operator will be described as an example. The display control unit 615 reduces the size of the first image based on the change instruction. The display control unit 615 causes the display device 11 to display the first image after being subjected to the reduction to be superimposed on the second image. The display control unit 615 changes a size relationship of the size of the first image to the second image by reducing the size of the first image.

A case where the change instruction is an enlargement instruction based on a pinch-out operation by the operator will be described as an example. The display control unit 615 enlarges the size of the first image based on the change instruction. The display control unit 615 causes the display device 11 to display the first image after being subjected to the enlargement to be superimposed on the second image. The display control unit 615 changes the size relationship of the size of the first image to the second image by enlarging the size of the first image.

A case where the change instruction is a rotation instruction based on a rotation operation by the operator will be described as an example. The display control unit 615 rotates the first image by an angle corresponding to an inclination of the operator's finger per unit time based on the change instruction. The display control unit 615 causes the display device 11 to display the first image after being subjected to the rotation to be superimposed on the second image. The display control unit 615 changes the orientation of the first image with respect to the second image by rotating the first image.

According to this example, the display control unit 615 can change the display mode of the first image based on the change instruction. With this configuration, the display control unit 615 can cause the first image adjusted to the display mode according to the operator's desire to be displayed.

The detection unit 617 detects a printing instruction input by the operator (ACT 10). In the ACT 10, for example, the detection unit 617 detects the printing instruction input by the operator via the input device 12. The printing instruction is a printing instruction for the first image. The printing instruction can also be referred to as a printing instruction for the image included in the first circumscribed rectangle. When it is determined that the detection unit 617 detects the printing instruction (YES in ACT 10), the process transitions from ACT 10 to ACT 11. When it is determined that the detection unit 617 does not detect the printing instruction (NO in ACT 8), the process transitions from ACT 10 to ACT 8.

The printing control unit 616 determines whether or not the first circumscribed rectangle is included in the second circumscribed rectangle, in response to the detection of the printing instruction by the detection unit 617 (ACT 11). The fact that the first circumscribed rectangle is included in the second circumscribed rectangle corresponds to the fact that the entire first circumscribed rectangle is superimposed on the second circumscribed rectangle. When it is determined that the first circumscribed rectangle is not included in the second circumscribed rectangle (NO in ACT 11), the process transitions from ACT 11 to ACT 12. The fact that the first circumscribed rectangle is not included in the second circumscribed rectangle corresponds to the fact that only a part of the first circumscribed rectangle is superimposed on the second circumscribed rectangle and the rest is not superimposed on the second circumscribed rectangle. When it is determined that the first circumscribed rectangle is included in the second circumscribed rectangle (YES in ACT 11), the process transitions from ACT 11 to ACT 13.

The printing control unit 616 crops an area, which is included in the second circumscribed rectangle, of the first circumscribed rectangle based on the fact that the first circumscribed rectangle is not included in the second circumscribed rectangle (ACT 12). In ACT 12, for example, the printing control unit 616 extracts an area, which is included in the second circumscribed rectangle, of the first circumscribed rectangle as a printing target area. The printing control unit 616 does not extract an area, which is not included in the second circumscribed rectangle, of the first circumscribed rectangle. The area, which is not included in the second circumscribed rectangle, of the first circumscribed rectangle is an area not targeted for printing.

The printing control unit 616 controls printing of the area, which is included in the second circumscribed rectangle, of the first circumscribed rectangle based on the printing instruction (ACT 13). In ACT 13, in one example, the printing control unit 616 controls printing with the cropped area as the printing target area. In another example, the printing control unit 616 controls printing with the entire area of the first circumscribed rectangle as the printing target area based on the fact that the first circumscribed rectangle is included in the second circumscribed rectangle.

The printing control unit 616 controls the printer unit 40 so as to form an image of the area, which is included in the second circumscribed rectangle, of the first circumscribed rectangle on the medium. The printer unit 40 forms the image of the area, which is included in the second circumscribed rectangle, of the first circumscribed rectangle on the medium under the control of the printing control unit 616.

According to this example, the printing control unit 616 can control the image portion included in the first image, which is adjusted to the size of the object included in the second image, to be formed on the medium. The printing control unit 616 can control the image portion included in the first image, which is changed to the display mode according to the operator's desire, to be formed on the medium. Furthermore, the printing control unit 616 can control the image of the cropped area to be formed on the medium. For that reason, the entire image portion included in the first image does not fall within the printing target area, and the amount of toner used can be reduced.

The printing control unit 616 may control printing so as to use a medium corresponding to the size of the area, which is included in the second circumscribed rectangle, of the first circumscribed rectangle. The printer unit 40 forms the image of an area, which is included in the second circumscribed rectangle, of the first circumscribed rectangle on the medium corresponding to the size of the area under the control of the printing control unit 616. In this example, the printing control unit 616 selects the medium having the smallest size capable of forming the image of the area, which is included in the second circumscribed rectangle, of the first circumscribed rectangle. A case where the printing control unit 616 crops the area, which is included in the second circumscribed rectangle, of the first circumscribed rectangle will be described as an example. The printing control unit 616 selects a medium having a size smaller than the minimum size capable of forming the entire image of the first circumscribed rectangle.

According to this example, the printing control unit 616 can select the medium having the smallest size capable of forming the image of the cropped area. With this configuration, the medium used can be suppressed to a minimum required size.

In the example described above, an example in which the display control unit 615 causes the display device 11 to display the first image whose size is adjusted by the adjustment unit 614 is described, but is not limited thereto. The adjustment process in ACT 6 may be omitted. In this example, the display control unit 615 may cause the display device 11 to display the first image based on the first image data acquired by the first acquisition unit 611 without the adjustment process by the adjustment unit 614.

According to this example, the display control unit 615 can present the size of the image portion included in the first image with respect to the size of the object included in the second image.

In ACT 13, the printing control unit 616 controls an image of the area, which is included in the second circumscribed rectangle, of the first circumscribed rectangle to be formed on the medium, but is not limited thereto. The operator may be able to input a designation instruction with a part of the first circumscribed rectangle as a printing target area via the input device 12. In this example, the printing control unit 616 forms an image of the printing target area designated in the first circumscribed rectangle on the medium based on the designation instruction. The printing control unit 616 controls printing so as to use a medium corresponding to the size of the printing target area designated in the first circumscribed rectangle. With this configuration, the medium used can be suppressed to the minimum required size.

Figure 5:
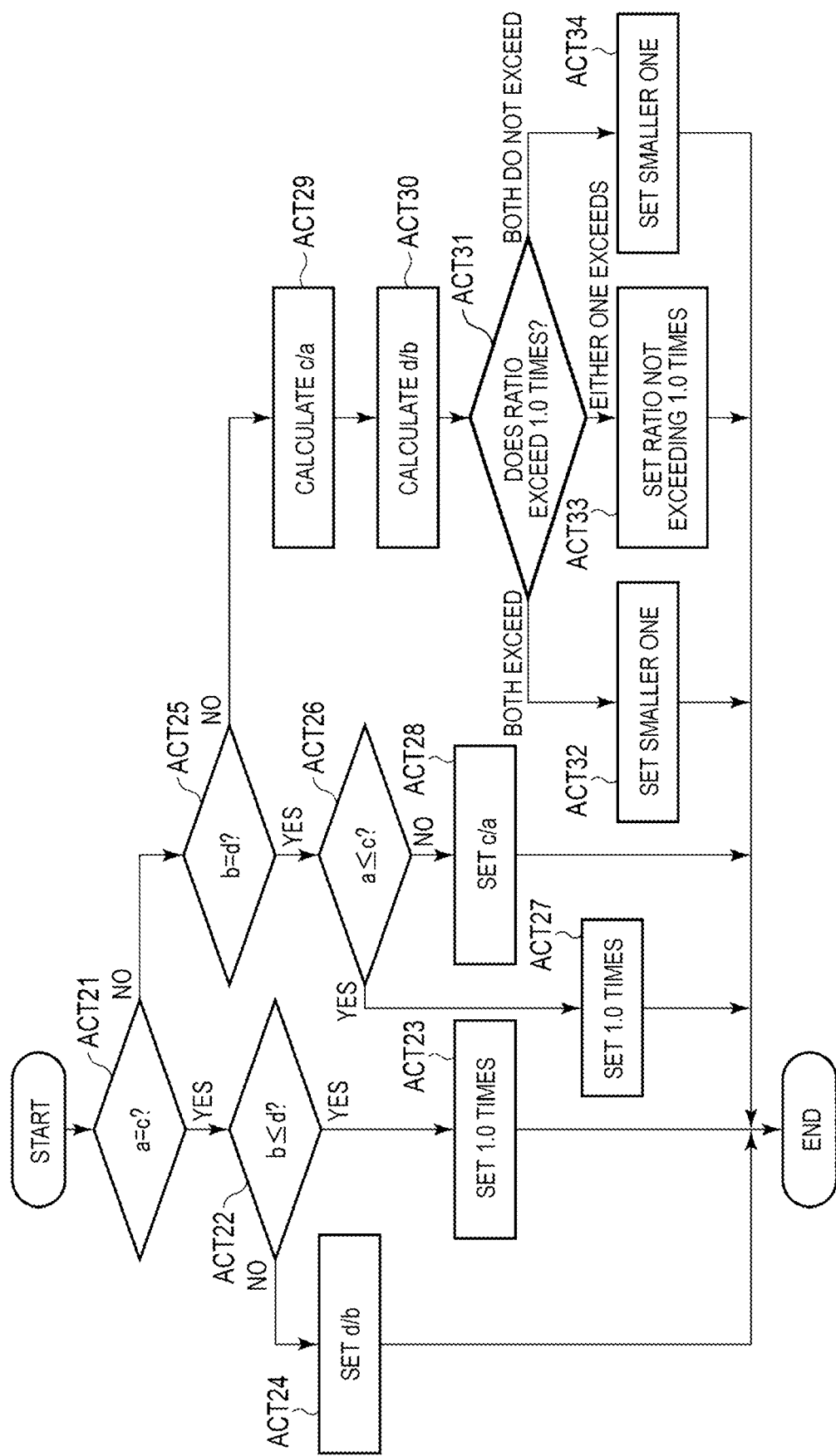
FIG. 5 is a flowchart illustrating a processing procedure for setting a magnification in the image forming apparatus of FIG. 2.

Next, an example of setting the magnification in ACT 6 will be described. FIG. 5 is a flowchart illustrating a processing procedure for setting the magnification in the image forming apparatus 1. The processing procedure described below is only an example, and each process may be changed as much as possible. The processing procedure described below can be omitted, replaced, or added as appropriate depending on the embodiment.

The adjustment unit 614 determines whether or not the length a of the first vertical width matches the length c of the second vertical width (ACT 21). When it is determined that the length a of the first vertical width matches the length c of the second vertical width (YES in ACT 21), the process transitions from ACT 21 to ACT 22. The adjustment unit 614 determines whether or not the length b of the first horizontal width is equal to or less than the length d of the second horizontal width (ACT 22).

When it is determined that the length b of the first horizontal width is equal to or less than the length d of the second horizontal width (YES in ACT 22), the process transitions from ACT 22 to ACT 23. The adjustment unit 614 sets 1.0 times as a magnification (ACT 23). Since the length a of the first vertical width matches the length c of the second vertical width, 1.0 times is a first ratio obtained by c/a.

The length a' of the first vertical width is a value obtained by multiplying the set magnification and the length a. The length a' of the first vertical width is equal to the length a. The length a' of the first vertical width matches the length c of the second vertical width. The length b' of the first horizontal width is a value obtained by multiplying the set magnification and the length b. The length b' of the first horizontal width is equal to the length b. The length b' of the first horizontal width is equal to or less than the length d of the second horizontal width. The first circumscribed rectangle satisfies the condition after the size adjustment of the first image by the adjustment unit 614.

When it is determined that the length b of the first horizontal width is not equal to or less than the length d of the second horizontal width (NO in ACT 22), the process transitions from ACT 22 to ACT 24. The fact that the length b of the first horizontal width is not equal to or less than the length d of the second horizontal width corresponds to the fact that the length b of the first horizontal width is longer than the length d of the second horizontal width. The adjustment unit 614 sets a second ratio obtained by d/b as a magnification (ACT 24). Since the length b of the first horizontal width is not equal to or less than the length d of the second horizontal width, the value obtained by d/b is smaller than 1.0.

The length a' of the first vertical width is a value obtained by multiplying the set magnification and the length a. The length a' of the first vertical width is shorter than the length a. The length a' of the first vertical width is shorter than the length c of the second vertical width. The length b' of the first horizontal width is a value obtained by multiplying the set magnification and the length b. The length b' of the first horizontal width is shorter than the length b. The length b' of the first horizontal width matches the length d of the second horizontal width. The first circumscribed rectangle satisfies the condition after the size adjustment of the first image by the adjustment unit 614.

When it is determined that the length a of the first vertical width does not match the length c of the second vertical width (NO in ACT 21), the process transitions from ACT 21 to ACT 25. The adjustment unit 614 determines whether or not the length b of the first horizontal width matches the length d of the second horizontal width (ACT 25). When it is determined that the length b of the first horizontal width matches the length d of the second horizontal width (YES in ACT 25), the process transitions from ACT 25 to ACT 26. The adjustment unit 614 determines whether or not the length a of the first vertical width is equal to or less than the length c of the second vertical width (ACT 26).

When it is determined that the length a of the first vertical width is equal to or less than the length c of the second vertical width (YES in ACT 26), the process transitions from ACT 26 to ACT 27. The adjustment unit 614 sets 1.0 times as a magnification (ACT 27). Since the length b of the first horizontal width matches the length d of the second horizontal width d, 1.0 times is the second ratio obtained by d/b.

The length a' of the first vertical width is a value obtained by multiplying the set magnification and the length a. The length a' of the first vertical width is equal to the length a. The length a' of the first vertical width is equal to or less than the length c of the second vertical width. The length b' of the first horizontal width is a value obtained by multiplying the set magnification and the length b. The length b' of the first horizontal width is equal to the length b. The length b' of the first horizontal width matches the length d of the second horizontal width. The first circumscribed rectangle satisfies the condition after the size adjustment of the first image by the adjustment unit 614.

When it is determined that the length a of the first vertical width is not equal to or less than the length c of the second vertical width (NO in ACT 26), the process transitions from ACT 26 to ACT 28. The fact that the length a of the first vertical width is not equal to or less than the length c of the second vertical width corresponds to the fact that the length a of the first vertical width is longer than the length c of the second vertical width. The adjustment unit 614 sets the first ratio obtained by c/a as a magnification (ACT 28). Since the length a of the first vertical width is not equal to or less than the length c of the second vertical width, the value obtained by c/a is smaller than 1.0.

The length a' of the first vertical width is a value obtained by multiplying the set magnification and the length a. The length a' of the first vertical width is shorter than the length a. The length a' of the first vertical width matches the length c of the second vertical width. The length b' of the first horizontal width is a value obtained by multiplying the set magnification and the length b. The length b' of the first horizontal width is shorter than the length b. The length b' of the first horizontal width is shorter than the length d of the second vertical width. The first circumscribed rectangle satisfies the condition after the size adjustment of the first image by the adjustment unit 614.

When it is determined that the length b of the first horizontal width does not match the length d of the second horizontal width (NO in ACT 25), the process transitions from ACT 25 to ACT 29. The adjustment unit 614 calculates the first ratio obtained by c/a (ACT 29). Since the length a of the first vertical width does not match the length c of the second vertical width, the value obtained by c/a is a value other than 1.0. The adjustment unit 614 calculates the second ratio obtained by d/b (ACT 30). Since the length b of the first horizontal width does not match the length d of the second horizontal width, the value obtained by d/b is a value other than 1.0.

The adjustment unit 614 determines whether or not each of the first ratio and the second ratio exceeds 1.0 times (ACT 31). The fact that the first ratio exceeds 1.0 times corresponds to the fact that the length a of the first vertical width is shorter than the length c of the second horizontal width. The fact that the second ratio exceeds 1.0 times corresponds to the fact that the length b of the first horizontal width is shorter than the length d of the second horizontal width.

When it is determined that both the first ratio and the second ratio exceed 1.0 times, the process transitions from ACT 31 to ACT 32. When it is determined that either the first ratio or the second ratio exceeds 1.0 times, the process transitions from ACT 31 to ACT 33. When it is determined that both the first ratio and the second ratio do not exceed 1.0 times, the process transitions from ACT 31 to ACT 34.

The adjustment unit 614 sets the smaller of the first ratio and the second ratio as the magnification (ACT 32). The reason why the adjustment unit 614 selects the smaller of the first ratio and the second ratio is to enlarge the first circumscribed rectangle within a range in which the first circumscribed rectangle satisfies the condition.

The length a' of the first vertical width is a value obtained by multiplying the set magnification and the length a. The length a' of the first vertical width is longer than the length a. The length a' of the first vertical width is equal to or less than the length c of the second vertical width. For example, when the first ratio is set as the magnification, the length a' of the first vertical width matches the length c of the second vertical width. For example, when the second ratio is set as the magnification, the length a' of the first vertical width is shorter than the length c of the second vertical width. When the second ratio matches the first ratio, the length a' of the first vertical width matches the length c of the second vertical width.

The length b' of the first horizontal width is a value obtained by multiplying the set magnification and the length b. The length b' of the first horizontal width is longer than the length b. The length b' of the first horizontal width is equal to or less than the length d of the second horizontal width. For example, when the first ratio is set as the magnification, the length b' of the first horizontal width is shorter than the length d of the second horizontal width. When the first ratio matches the second ratio, the length b' of the first horizontal width matches the length d of the second horizontal width. For example, when the second ratio is set as the magnification, the length b' of the first horizontal width matches the length d of the second horizontal width. The first circumscribed rectangle satisfies the condition after the size adjustment of the first image by the adjustment unit 614.

The adjustment unit 614 sets the first ratio and the second ratio, whichever does not exceed 1.0 times, as the magnification (ACT 33). The reason why the adjustment unit 614 selects the one of the first ratio and the second ratio that does not exceed 1.0 times is to adjust the first circumscribed rectangle within the range where the first circumscribed rectangle satisfies the condition.

The length a' of the first vertical width is a value obtained by multiplying the set magnification and the length a. The length a' of the first vertical width is shorter than the length a. The length a' of the first vertical width is equal to or less than the length c of the second vertical width. For example, when the first ratio is set as the magnification, the length a' of the first vertical width matches the length c of the second vertical width. For example, when the second ratio is set as the magnification, the length a' of the first vertical width is shorter than the length c of the second vertical width.

The length b' of the first horizontal width is a value obtained by multiplying the set magnification and the length b. The length b' of the first horizontal width is shorter than the length b. The length b' of the first horizontal width is equal to or less than the length d of the second horizontal width. For example, when the first ratio is set as the magnification, the length b' of the first horizontal width is shorter than the length d of the second horizontal width. For example, when the second ratio is set as the magnification, the length b' of the first horizontal width matches the length d of the second horizontal width. The first circumscribed rectangle satisfies the condition after the size adjustment of the first image by the adjustment unit 614.

The adjustment unit 614 sets the smaller of the first ratio and the second ratio as the magnification (ACT 34). The reason why the adjustment unit 614 selects the smaller of the first ratio and the second ratio is to reduce the first circumscribed rectangle within the range in which the first circumscribed rectangle satisfies the condition.

The length a' of the first vertical width is a value obtained by multiplying the set magnification and the length a. The length a' of the first vertical width is shorter than the length a. The length a' of the first vertical width is equal to or less than the length c of the second vertical width. For example, when the first ratio is set as the magnification, the length a' of the first vertical width matches the length c of the second vertical width. For example, when the second ratio is set as the magnification, the length a' of the first vertical width is shorter than the length c of the second vertical width. When the second ratio matches the first ratio, the length a' of the first vertical width matches the length c of the second vertical width.

The length b' of the first horizontal width is a value obtained by multiplying the set magnification and the length b. The length b' of the first horizontal width is shorter than the length b. The length b' of the first horizontal width is equal to or less than the length d of the second horizontal width. For example, when the first ratio is set as the magnification, the length b' of the first horizontal width is shorter than the length d of the second horizontal width. When the first ratio matches the second ratio, the length b' of the first horizontal width matches the length d of the second horizontal width. For example, when the second ratio is set as the magnification, the length b' of the first horizontal width matches the length d of the second horizontal width. The first circumscribed rectangle satisfies the condition after the size adjustment of the first image by the adjustment unit 614.

Figure 6:
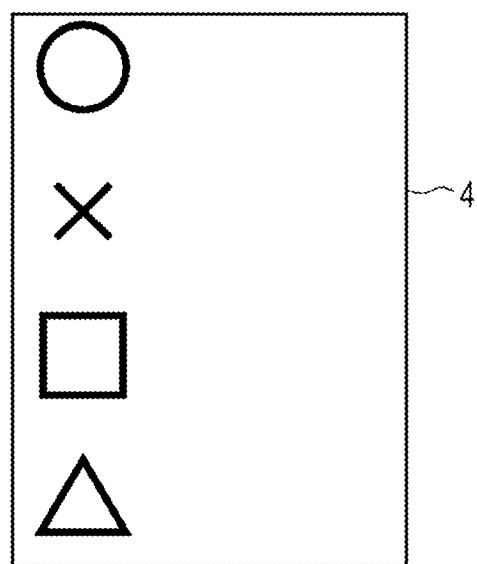
FIG. 6 is a diagram illustrating an example of a first image according to an embodiment.
Figure 7:
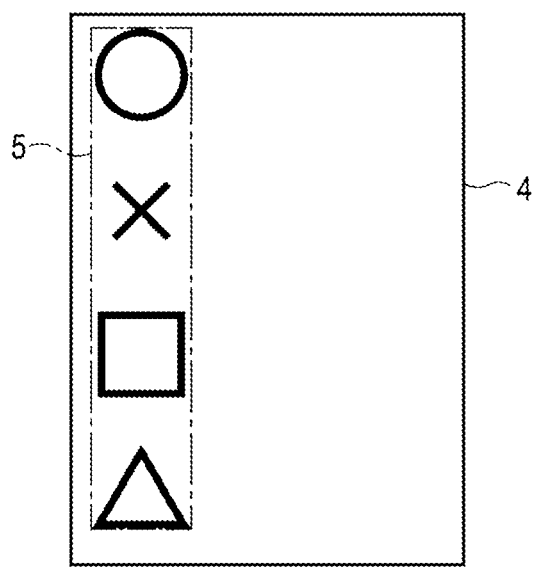
FIG. 7 is a diagram illustrating an example of a first circumscribed rectangle according to an embodiment.

An example of the first image will be described. FIG. 6 is a diagram illustrating an example of a first image 4. The first image 4 is a rectangular image including an image portion in which a picture, a character, or the like is present and a blank portion in which the picture, the character, or the like is not present.

An example of the first circumscribed rectangle will be described. FIG. 6 is a diagram illustrating an example of a first circumscribed rectangle 5. The first circumscribed rectangle 5 is indicated by one dot chain line (e.g., a dot-dash line). The first circumscribed rectangle 5 is the smallest rectangle, which includes the entire image portion, of the first image 4. A picture, a character, or the like is present inside the first circumscribed rectangle 5, and the picture, the character, or the like is not present outside the first circumscribed rectangle 5.

Figure 8:
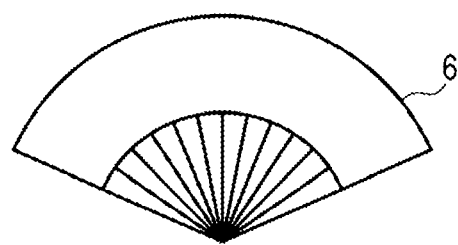
FIG. 8 is a diagram illustrating an example of an object according to an embodiment.

An example of an object will be described. FIG. 8 is a diagram illustrating an example of an object 6. The object 6 is a folding fan, but it is not limited thereto. The object 6 may be various objects such as a file spine, a drawing of a construction site, or the like instead of a folding fan. It is assumed that the object 6 has a size that does not fit in the reading area of the scanner unit 20.

Figure 9:
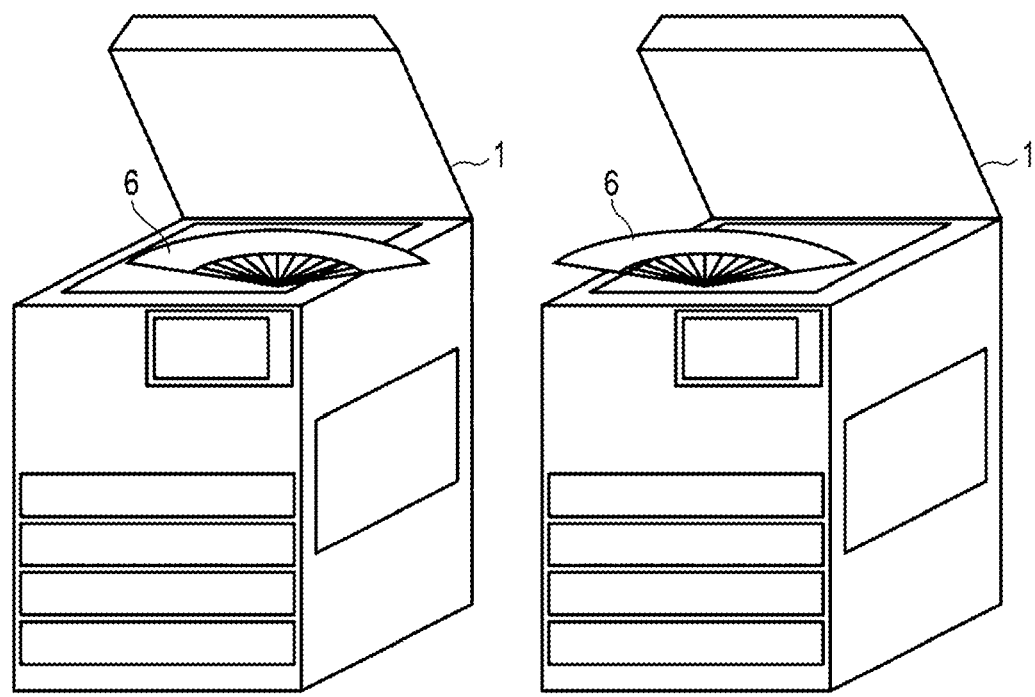
FIG. 9 is a diagram illustrating an example of a plurality of times of readings of the object using the image forming apparatus of FIG. 2.

An example of a plurality of times of readings of the object 6 using the image forming apparatus 1 will be described. FIG. 9 is a diagram illustrating an example of a plurality of times of readings of the object 6 using the image forming apparatus 1. The scanner unit 20 reads the object 6 each time the object 6 is placed on a document platen while shifting on the document platen, and generates image data relating to the object 6. The scanner unit 20 generates a plurality of image data relating to the object 6 based on a plurality of times of readings of the object 6. By way of example, the scanner unit 20 may read a first portion of the object 6 and generate a first set of partial image data corresponding to the first portion of the object 6, the first portion being smaller than the entire object. Subsequently, the scanner unit 20 may read a second portion of the object 6 and generate a second set of partial image data corresponding to the second portion of the object 6, the second portion being smaller than the entire object. This process may be repeated any number of times until the entire object 6 has been read.

Figure 10:
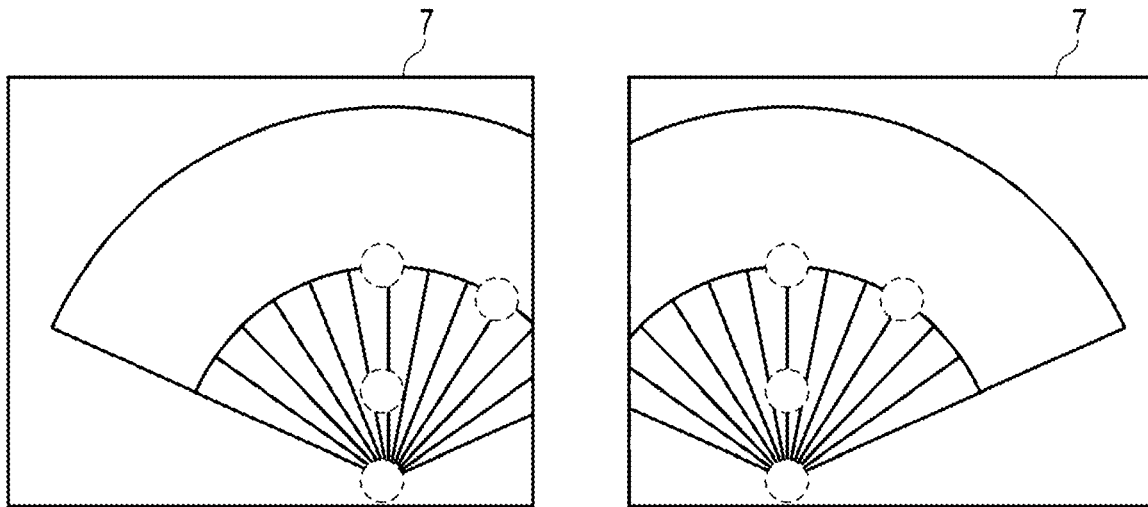
FIG. 10 is a diagram illustrating an example of a process of generating second image data according to an embodiment.

An example of generating second image data will be described. FIG. 10 is a diagram illustrating an example of a process of generating the second image data. FIG. 10 illustrates a plurality of images 7 relating to the object 6 based on a plurality of image data relating to the object 6. Each of the plurality of images 7 includes a part, portion, or section of the object, not the entire object. The plurality of images 7 are images different from each other. The number of the plurality of images 7 is not limited to two.

The generation unit 613 detects one or more feature points from the plurality of images 7. For example, the generation unit 613 may use an existing SIFT method for detecting one or more feature points or datums. Feature points are indicated by circles of dashed lines.

Figure 11:
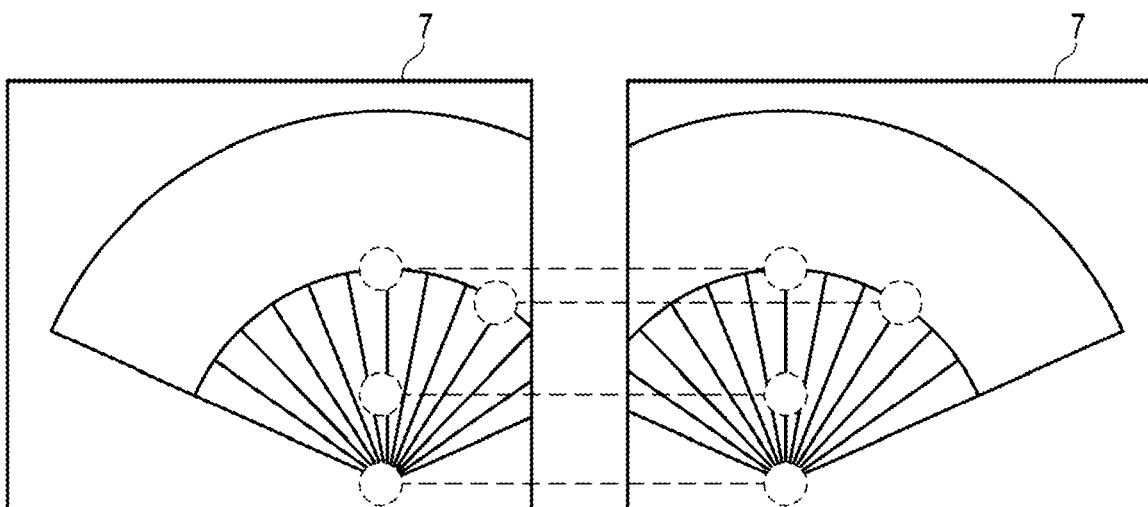
FIG. 11 is a diagram illustrating another example of the process of generating second image data according to the embodiment.

FIG. 11 is a diagram illustrating an example of a process of generating the second image data.

FIG. 11 illustrates the plurality of images 7. The generation unit 613 detects a relationship between the plurality of images 7 based on one or more feature points, and matches the plurality of images 7 with each other. For example, the generation unit 613 may use an existing normalized cross correlation (NCC) for matching the plurality of images 7. The generation unit 613 acquires the size of the entire object 6 by matching the plurality of images 7 with each other, and generates the second image data.

Figure 12:
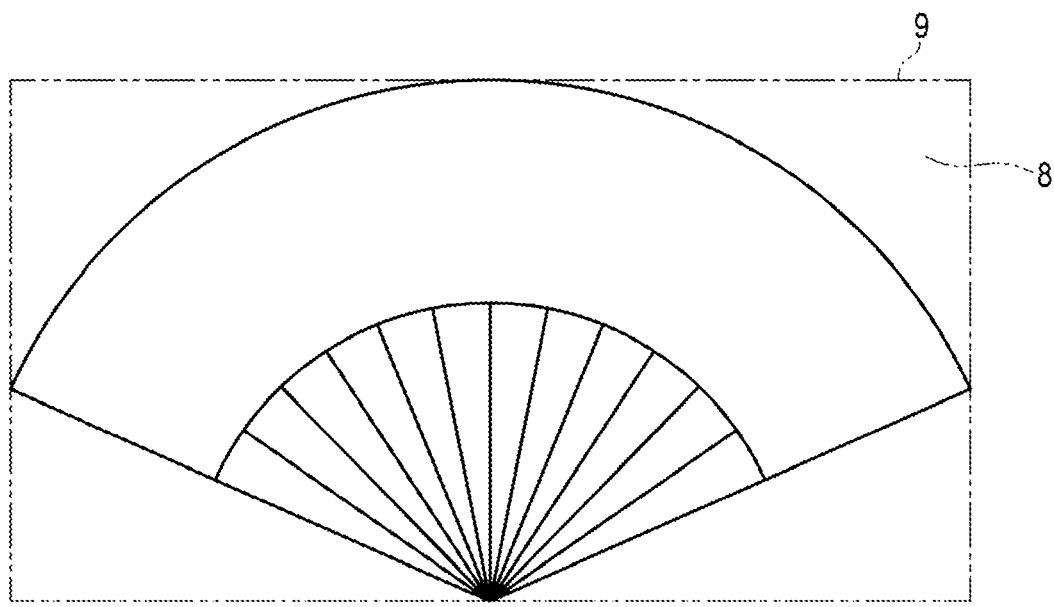
FIG. 12 is a diagram illustrating an example of a second image and a second circumscribed rectangle according to an embodiment.

An example of a second image and a second circumscribed rectangle will be described. FIG. 12 is a diagram illustrating an example of a second image 8 and a second circumscribed rectangle 9. The second image 8 is a rectangular image including an image portion corresponding to the entire object 6 and a blank portion in which the object 6 is not present.

The second circumscribed rectangle 9 is indicated by two-dot chain line. The second circumscribed rectangle 9 is the smallest rectangle of the second image 8 that includes the entire image portion corresponding to the entire object 6. The object 6 is present inside the second circumscribed rectangle 9, and the object 6 is not present outside the second circumscribed rectangle 9. Here, although an example in which the outer edge of the second circumscribed rectangle 9 is the same as the outer edge of the second image 8 will be described, the outer edge of the second circumscribed rectangle 9 may be different from the outer edge of the second image 8.

Figure 13:
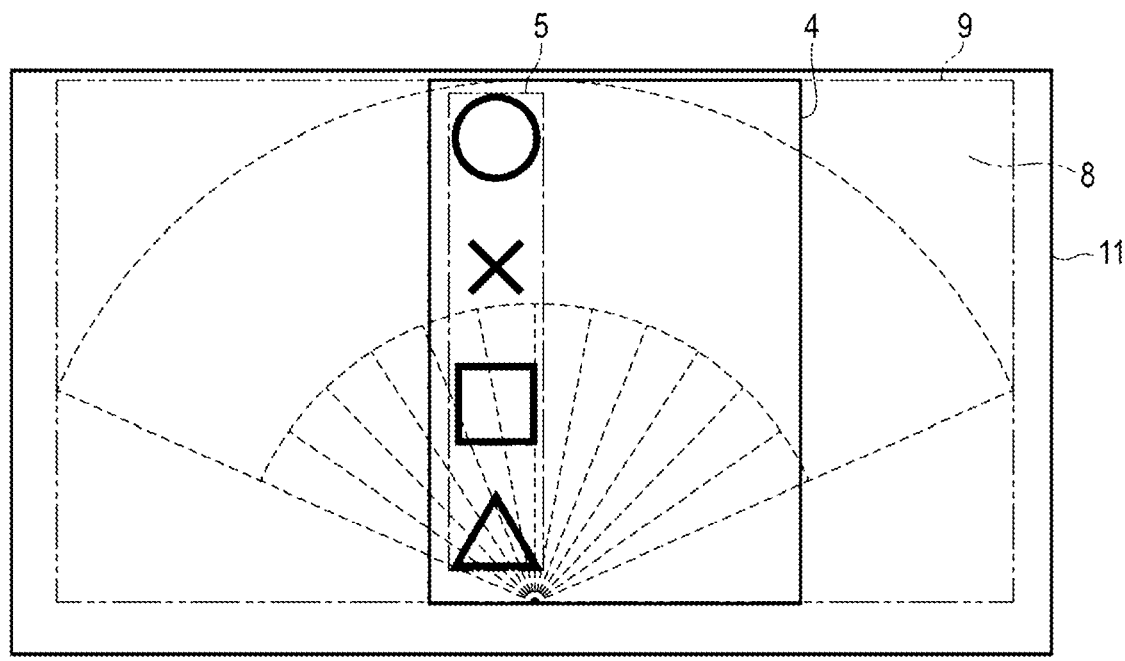
FIG. 13 is a diagram illustrating an example of a relationship between the first image before being subjected to adjustment and the second image according an embodiment.

A display example of the first image 4 and the second image 8 on the display device 11 will be described. FIG. 13 is a diagram illustrating an example of the relationship between the first image 4 before being subjected to the size adjustment by the adjustment unit 614 and the second image 8. FIG. 13 illustrates an example in which the display device 11 displays the first image 4 before being subjected to the size adjustment by the adjustment unit 614 to be superimposed on the second image 8 as a comparative example.

The first circumscribed rectangle 5 is included in the second circumscribed rectangle 9. The length a of the first vertical width of the first circumscribed rectangle 5 is shorter than the length c of the second vertical width of the second circumscribed rectangle 9. The length b of the first horizontal width of the first circumscribed rectangle 5 is shorter than the length d of the second horizontal width of the second circumscribed rectangle 9. For that reason, the first circumscribed rectangle 5 does not satisfy the condition described above.

Figure 14:
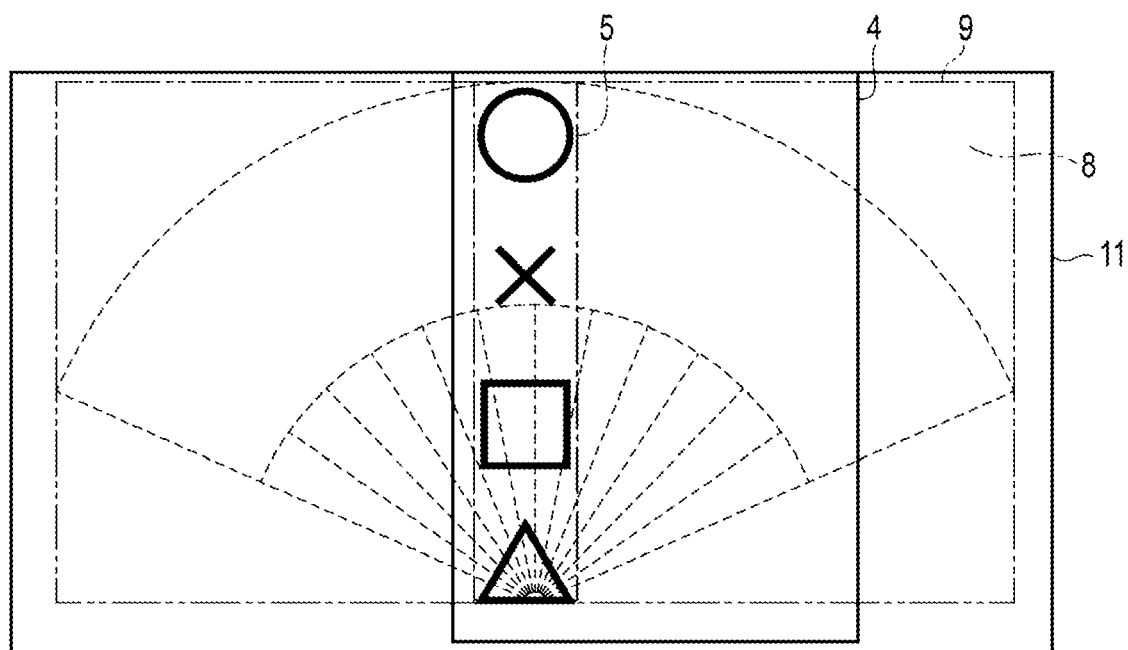
FIG. 14 is a diagram illustrating an example of a screen view for displaying the first image after being subjected to adjustment and the second image according to the embodiment.

FIG. 14 is a diagram illustrating an example of a screen view for displaying the first image 4 after being subjected to the size adjustment by the adjustment unit 614 and the second image 8. The display device 11 displays the first image 4 whose size is adjusted by the adjustment unit 614 to be superimposed on the second image 8.

The first circumscribed rectangle 5 is included in the second circumscribed rectangle 9. The length a' of the first vertical width of the first circumscribed rectangle 5 becomes longer than the length a with the adjustment of the size of the first image 4 by the adjustment unit 614. The length a' of the first vertical width of the first circumscribed rectangle 5 matches the length c of the second vertical width of the second circumscribed rectangle 9. The length b' of the first horizontal width of the first circumscribed rectangle 5 becomes longer than the length b with the adjustment of the size of the first image 4 by the adjustment unit 614. The length b' of the first horizontal width of the first circumscribed rectangle 5 is shorter than the length d of the second horizontal vertical width of the second circumscribed rectangle 9. For that reason, the first circumscribed rectangle 5 satisfies the condition described above.

Figure 15:
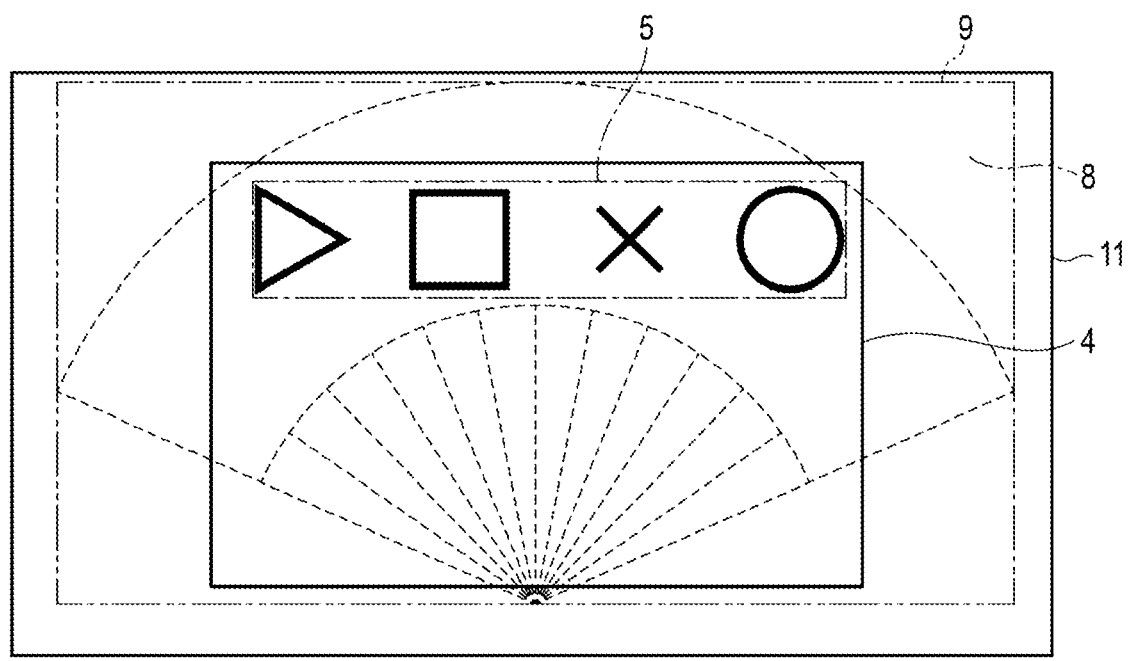
FIG. 15 is a diagram illustrating an example of a screen view for displaying the first image after being subjected to change of a display mode and the second image according to an embodiment.

An example of changing the display mode of the first image 4 in the display device 11 will be described. FIG. 15 is a diagram illustrating an example of a screen view for displaying the first image 4 after being subjected to change of the display mode and the second image 8. It is assumed that the operator inputs an enlargement change instruction and a 90-degree rotation change instruction to the first image 4 after being subjected to the size adjustment illustrated in FIG. 14 via the input device 12. The operator can adjust the size of four required marks included in the first image 4 to match the size of the object 6 included in the second image 8 via the input device 12.

The display control unit 615 enlarges the size of the first image 4 based on the enlargement change instruction. The display control unit 615 rotates the orientation of the first image 4 after being subjected to the enlargement by 90 degrees based on the 90-degree rotation change instruction. The display control unit 615 causes the display device 11 to display the first image 4 after being subjected to the enlargement and the rotation of 90 degrees to be superimposed on the second image 8.

Figure 16:
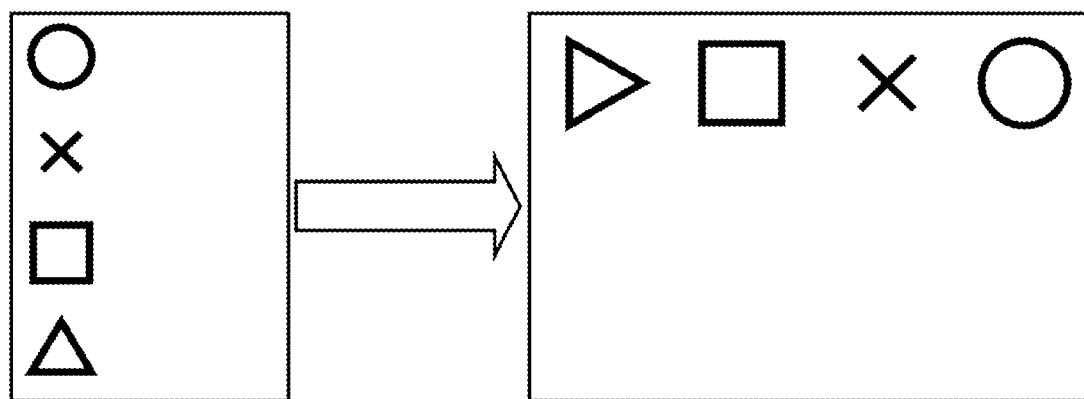
FIG. 16 is a diagram illustrating an example of a printed matter according to an embodiment.

An example of a printed matter based on the first image 4 will be described. FIG. 16 is a diagram illustrating an example of the printed matter based on the first image 4.

The figure illustrated on the left side of FIG. 16 illustrates a printed matter based on the first image 4 after being subjected to the size adjustment of the first image 4 by the adjustment unit 614 and before being subjected to change of the display mode by the display control unit 615. Since the first circumscribed rectangle 5 is included in the second circumscribed rectangle 9 as illustrated in FIG. 14, the printer unit 40 forms an image of the entire area of the first circumscribed rectangle 5 on a medium.

The figure illustrated on the right side of FIG. 16 illustrates a printed matter based on the first image 4 after being subjected to change of the display mode by the display control unit 615. Since the first circumscribed rectangle 5 is included in the second circumscribed rectangle 9 as illustrated in FIG. 15, the printer unit 40 forms the image of the entire area of the first circumscribed rectangle 5 on the medium. The image of the printed matter illustrated on the right side of FIG. 16 is larger than the image of the printed matter illustrated on the left side of FIG. 16 due to the change of the display mode by the display control unit 615.

Figure 17:
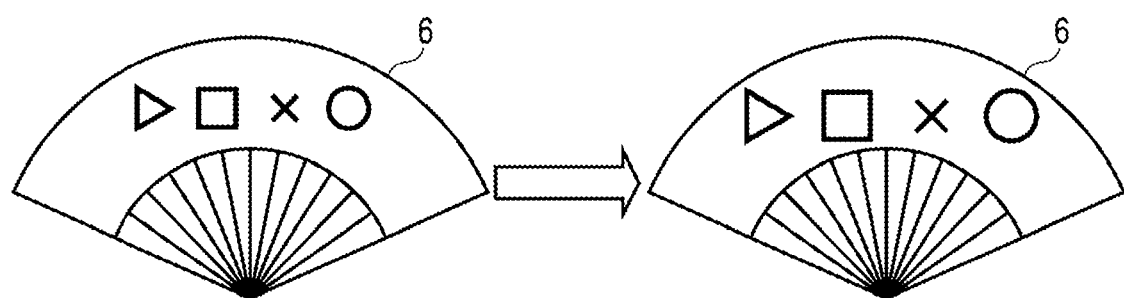
FIG. 17 is a diagram illustrating an example of a relationship between the printed matter and the object according to an embodiment.

An example of the relationship between the printed matter based on the first image 4 and the object 6 will be described. FIG. 17 is a diagram illustrating an example of the relationship between the printed matter based on the first image 4 and the object 6. The figure illustrated on the left side of FIG. 17 illustrates an example in which the image of the printed matter illustrated on the left side of FIG. 16 is superimposed on the object 6. The figure illustrated on the right side of FIG. 17 illustrates an example in which the image of the printed matter illustrated on the right side of FIG. 16 is superimposed on the object 6. It can be seen that the image of the printed matter illustrated on the right side of FIG. 16 is changed to a size more appropriate for the size of the object 6 than the image of the printed matter illustrated on the left side of FIG. 16.

Figure 18:
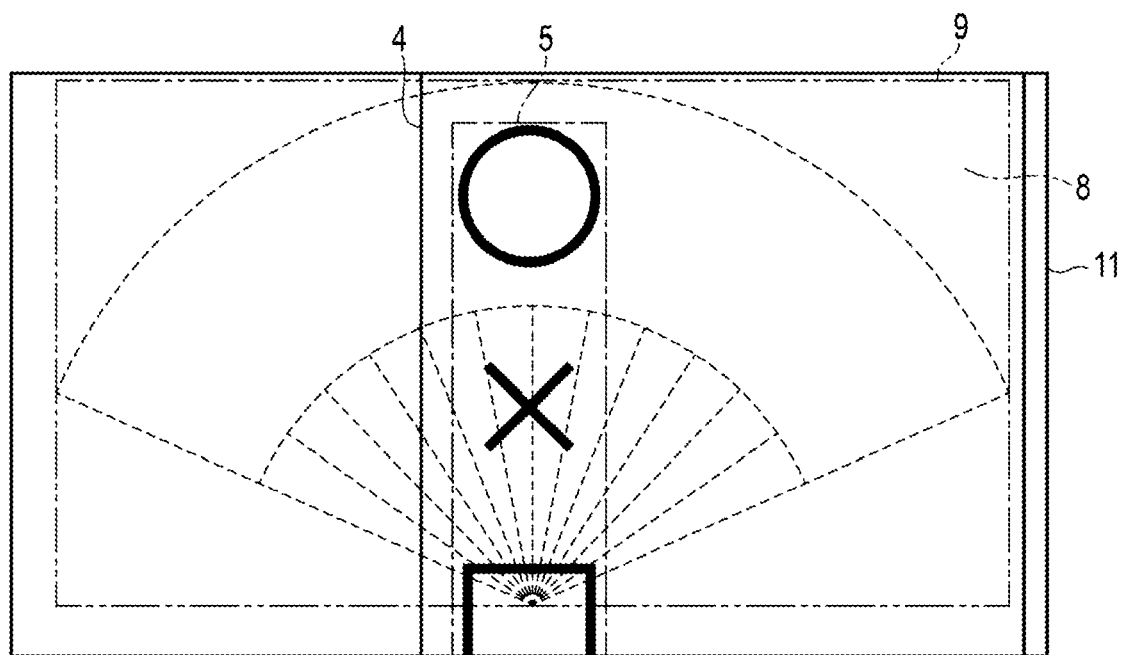
FIG. 18 is a diagram illustrating another example of the screen view for displaying the first image after being subjected to change of the display mode and the second image according to the embodiment.

Another example of changing the display mode of the first image 4 in the display device 11 will be described. FIG. 18 is a diagram illustrating another example of a screen view for displaying the first image 4 after being subjected to the change of the display mode and the second image 8. It is assumed that the operator inputs the enlargement change instruction to the first image 4 after being subjected to the size adjustment illustrated in FIG. 14 via the input device 12. It is assumed that the enlargement change instruction is an instruction in which a part of the first circumscribed rectangle 5 does not fit in the second circumscribed rectangle 9. The operator can adjust the size of the required circle mark included in the first image 4 to match the size of the object 6 included in the second image 8 via the input device 12.

The display control unit 615 enlarges the size of the first image 4 based on the enlargement change instruction. The display control unit 615 causes the display device 11 to display the first image 4 after being subjected to the enlargement to be superimposed on the second image 8. With the enlargement of the first image by the adjustment unit 614, a part of the first circumscribed rectangle 5 remains superimposed on the second circumscribed rectangle 9, but the rest of the first circumscribed rectangle 5 is not superimposed on the second circumscribed rectangle.

Figure 19:
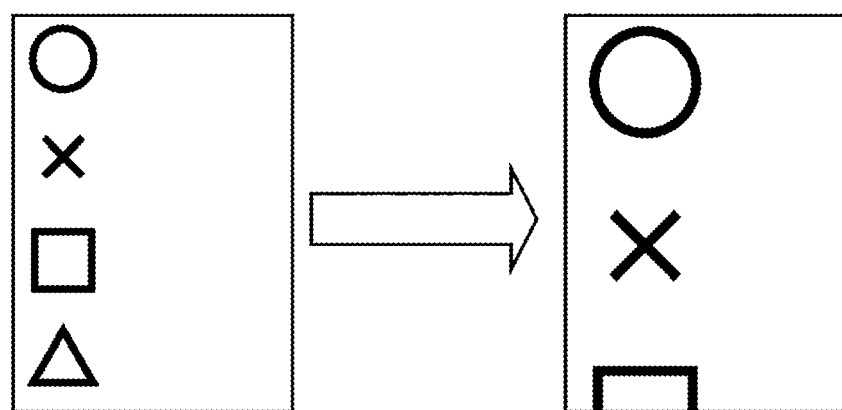
FIG. 19 is a diagram illustrating another example of the printed matter according to the embodiment.

An example of a printed matter based on the first image 4 will be described. FIG. 19 is a diagram illustrating another example of the printed matter based on the first image 4.

The figure illustrated on the left side of FIG. 19 illustrates a printed matter based on the first image 4 after being subjected to the size adjustment of the first image 4 by the adjustment unit 614 and before being subjected to change of the display mode by the display control unit 615. Since the first circumscribed rectangle 5 is included in the second circumscribed rectangle 9 as illustrated in FIG. 14, the printer unit 40 forms an image of the entire area of the first circumscribed rectangle 5 on the medium.

The figure illustrated on the right side of FIG. 19 illustrates the printed matter based on the first image 4 after being subjected to change of the display mode by the display control unit 615. The printing control unit 616 crops the area included in the second circumscribed rectangle 9 of the first circumscribed rectangle 5. The area, which is included in the second circumscribed rectangle 9, of the first circumscribed rectangle 5 is the printing target area. The area of the first circumscribed rectangle 5, which is not included in the second circumscribed rectangle 9, is an area not targeted for printing. The printer unit 40 forms an image of the cropped area on a medium corresponding to the size of this area. The image of the printed matter illustrated on the right side of FIG. 19 is larger than the image of the printed matter illustrated on the left side of FIG. 19 due to the change of the display mode by the display control unit 615. The image of the printed matter illustrated on the right side of FIG. 19 is an image of a part of the area of the first circumscribed rectangle 5 due to the change of the display mode by the display control unit 615. The size of the printed matter medium illustrated on the right side of FIG. 19 is smaller than the size of the printed matter medium illustrated on the left side of FIG. 19.

Figure 20:
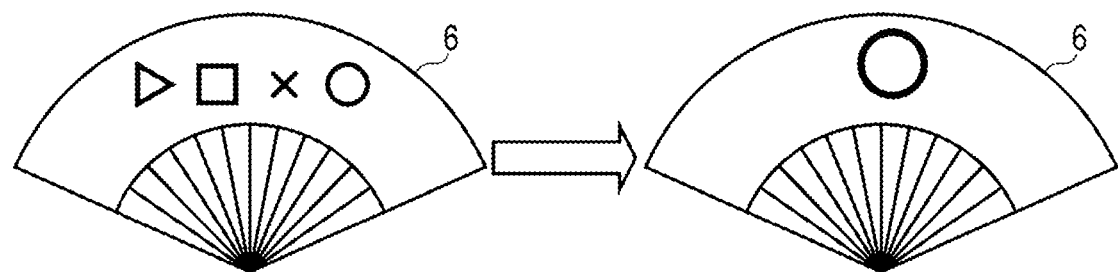
FIG. 20 is a diagram illustrating another example of the relationship between the printed matter and the object according to the embodiment.

Another example of the relationship between the printed matter based on the first image 4 and the object 6 will be described. FIG. 20 is a diagram illustrating another example of the relationship between the printed matter based on the first image 4 and the object 6. The figure illustrated on the left side of FIG. 20 illustrates an example in which the image of the printed matter illustrated on the left side of FIG. 19 is superimposed on the object 6. The figure illustrated on the right side of FIG. 20 illustrates an example in which the image of the printed matter illustrated on the right side of FIG. 19 is superimposed on the object 6. It can be seen that the image of the printed matter illustrated on the right side of FIG. 19 is changed to a size more appropriate for the size of the object 6 than the image of the printed matter illustrated on the left side of FIG. 19.

The information processing apparatus may be realized by one apparatus as described above with the image forming apparatus 1 as an example, or may be realized by a system in which the functions are distributed to a plurality of apparatus.

The information processing apparatus is not limited to the image forming apparatus 1 described above. The information processing apparatus may be realized by the terminal 3 described above. In this example, the terminal 3 includes a display device similar to the display device 11. The terminal 3 includes an input device similar to the input device 12. The terminal 3 includes a control circuit similar to the control circuit 61. The terminal 3 includes the units similar to the first acquisition unit 611, the second acquisition unit 612, the generation unit 613, the adjustment unit 614, the display control unit 615, the printing control unit 616, and the detection unit 617. The first acquisition unit 611 may acquire the first image data from the image forming apparatus 1. The second acquisition unit 612 can acquire a plurality of image data based on a plurality of times of readings of the object by the scanner unit 20 from the image forming apparatus 1. The printing control unit 616 can control printing by outputting data of the area, which is included in the second circumscribed rectangle, of the first circumscribed rectangle to the image forming apparatus 1.

The transfer of an apparatus is generally performed in a state where a program is stored in a main memory or an auxiliary storage device. However, the exemplary embodiment is not limited thereto, and the program may be transferred without being stored in the main memory or the auxiliary storage device. In this case, a program transferred separately from the apparatus is written to a writable storage device provided in the apparatus according to an operation by the user or the like. The transfer of the program can be done by recording on a removable recording medium or by communication via a network. The recording medium is a non-transitory tangible medium. The recording medium is a computer-readable medium. The recording medium may be in any form as long as the recording medium, such as a CD-ROM or a memory card, can store a program and the apparatus can read the recording medium. A function obtained by installing or downloading the program may be one that realizes the function in cooperation with an operating system (OS) or the like inside the apparatus.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a scanner configured to read an object to acquire multiple sets of image data, each set of image data corresponding to the object; and
   a controller configured to:
   acquire first image data representing a first image;
   generate second image data representing a second image corresponding to the object based on the sets of image data;
   adjust a size of the first image based on a first circumscribed rectangle of the first image and a second circumscribed rectangle of the second image; and
   generate third image data representing a third image that includes the first image, whose size is adjusted, superimposed on the second image.

2. The information processing apparatus of claim 1, further comprising a printer operatively coupled to the controller, wherein the controller is configured to control the printer to print the third image.

3. The information processing apparatus of claim 1, wherein
   the controller is configured to adjust the size of the first image such that the first circumscribed rectangle is included in the second circumscribed rectangle and at least one of:
   a first vertical dimension of the first circumscribed rectangle is equal to a second vertical dimension of the second circumscribed rectangle; or
   a first horizontal dimension of the first circumscribed rectangle is equal to a second horizontal dimension of the second circumscribed rectangle.

4. The information processing apparatus of claim 3, wherein
   the controller is configured to adjust the size of the first image by magnifying the first vertical dimension and the second vertical dimension by either (a) a first ratio that is based on the first vertical dimension and the second vertical dimension or (b) a second ratio that is based on the first horizontal dimension and the second horizontal dimension.

5. The information processing apparatus of claim 1, wherein:
   the object is sized such that the object does not fit in a reading area of the scanner;
   each set of image data corresponds to a reading of a portion of the object by the scanner; and
   the second image corresponds to the entire object.

6. The information processing apparatus of claim 1, further comprising a display operatively coupled to the controller, the display being configured to change a display mode of the first image in response to receiving a display mode change instruction for the first image from a user.

7. The information processing apparatus of claim 1, wherein
   the controller is configured to control printing of an area of the first circumscribed rectangle of the first image that is included in the second circumscribed rectangle of the second image in response to receiving a printing instruction input from the user.

8. The information processing apparatus of claim 7, wherein
   the controller is configured to select a medium to be used for printing that corresponds to the size of the area of the first circumscribed rectangle that is included in the second circumscribed rectangle.

9. An image generation method comprising:
acquiring first image data representing a first image;
acquiring multiple sets of image data, each set of image data corresponding to a reading of an object by a scanner;
generating second image data representing a second image corresponding to the object based on the sets of image data;
adjusting a size of the first image based on a first circumscribed rectangle of the first image and a second circumscribed rectangle of the second image; and
generating third image data representing a third image that includes the first image, whose size is adjusted, superimposed on the second image.

10. The image generation method of claim 9, further comprising controlling printing of the third image in response to receiving a printing instruction input from the user.

11. The image generation method of claim 9, wherein the third image includes an area of the first circumscribed rectangle of the first image that is included in the second circumscribed rectangle of the second image.

12. The image generation method of claim 9, wherein adjusting the size of the first image includes adjusting the size of the first image such that the first circumscribed rectangle is included in the second circumscribed rectangle and at least one of:
a first vertical dimension of the first circumscribed rectangle is equal to a second vertical dimension of the second circumscribed rectangle; or
a first horizontal dimension of the first circumscribed rectangle is equal to a second horizontal dimension of the second circumscribed rectangle.

13. The image generation method of claim 12, wherein adjusting the size of the first image includes adjusting the size of the first image by magnifying the first vertical dimension and the second vertical dimension by either (a) a first ratio that is based on the first vertical dimension and the second vertical dimension or (b) a second ratio that is based on the first horizontal dimension and the second horizontal dimension.

14. The image generation method of claim 9, wherein:
the object is dimensioned such that the object does not fit in a reading area of the scanner;
each set of image data corresponds to a reading of a portion of the object by the scanner; and
the second image data corresponds to the entire object.

15. The image generation method of claim 9, further comprising:
displaying the first image on a display; and
changing a display mode of the first image on the display in response to receiving a display mode change instruction for the first image from a user.

16. The image generation method of claim 9, further comprising:
controlling printing of the third image in response to receiving a printing instruction input from the user.

17. The image generation method of claim 16, wherein the third image includes an area of the first circumscribed rectangle of the first image that is included in the second circumscribed rectangle of the second image.

18. The image generation method of claim 17, further comprising:
selecting a medium to be used for printing that corresponds to the size of the area of the first circumscribed rectangle that is included in the second circumscribed rectangle.

19. A method of operating an information processing system comprising:
acquiring first image data representing a first image;
generating, by a scanner, multiple sets of partial image data, each set of partial image data corresponding to a reading of a portion of an object by the scanner;
generating second image data representing a second image of the entire object based on the sets of partial image data; and
printing, by a printer, at least one of (a) an area of a first circumscribed rectangle of the first image that is included in the second image or (b) an area of the first image that is included in a second circumscribed rectangle of the second image.

20. The method of claim 19, further comprising:
adjusting a size of the first image relative to the second image based on either (a) a horizontal dimension of the first image and a horizontal dimension of the second image or (b) a vertical dimension of the first image and a vertical dimension of the second image.

* * * * *